US011208289B2

(12) United States Patent
Lee et al.

(10) Patent No.: US 11,208,289 B2
(45) Date of Patent: Dec. 28, 2021

(54) DISH STACKING CART

(71) Applicant: Dishcraft Robotics, Inc., San Carlos, CA (US)

(72) Inventors: Timothy Young Lee, San Francisco, CA (US); Jacob Conor Dooris, East Palo Alto, CA (US); Abigail Elizabeth Soong, San Francisco, CA (US); Katrina Bell Sheehy, Redwood City, CA (US); Michael William Tschudy, Palo Alto, CA (US); Taylor Joseph Cone, Belmont, CA (US)

(73) Assignee: Dishcraft Robotics, Inc., San Carlos, CA (US)

( * ) Notice: Subject to any disclaimer, the term of this patent is extended or adjusted under 35 U.S.C. 154(b) by 0 days.

(21) Appl. No.: 16/877,300

(22) Filed: May 18, 2020

(65) Prior Publication Data

US 2020/0283044 A1 Sep. 10, 2020

Related U.S. Application Data

(63) Continuation of application No. 16/295,415, filed on Mar. 7, 2019, now Pat. No. 10,654,504.

(51) Int. Cl.
*B65H 31/30* (2006.01)
*B62B 5/00* (2006.01)
(Continued)

(52) U.S. Cl.
CPC ............. *B65H 31/30* (2013.01); *B62B 3/02* (2013.01); *B62B 3/108* (2013.01); *B62B 5/00* (2013.01);
(Continued)

(58) Field of Classification Search
CPC ........ B62B 1/10; B62B 1/264; B62B 2202/02; B62B 2203/44; B65H 31/32; Y10S 414/103; H01L 21/67724
See application file for complete search history.

(56) References Cited

U.S. PATENT DOCUMENTS 2,972,421 A  2/1961 Frick
3,173,546 A  3/1965 Vershbow
(Continued)

FOREIGN PATENT DOCUMENTS

EP  0985541 A2  3/2000
FR  2721735 A1  12/1995
(Continued)

OTHER PUBLICATIONS

International Search Report and Written Opinion, PCT/US2020/021282, dated Jun. 25, 2020, 11 pgs.
(Continued)

*Primary Examiner* — Gregory W Adams
(74) *Attorney, Agent, or Firm* — Loza & Loza, LLP

(57) ABSTRACT

A dish cart includes a top with a slot for receiving a lift arm that may be lifted up through the slot to raise or lower dishes. Lobe openings emanating from the slot receive lobes of a lift paddle secured to the lift arm. The cart may define a gap below the top for permitting insertion of the lift paddle and the lift arm. The cart may be adjusted to receive differently sized dishes by means of rails of different sizes or adjustable vanes. A dish drop station includes the lift arm and lift paddle and a lift mechanism for raising and lower the lift arm. The dish drop station may include a cart present sensor and include a lock for retaining the cart. The controller may be programmed to the lower the lift arm to an unlock position that disengages the cart lock.

13 Claims, 25 Drawing Sheets

(51) Int. Cl.
  *B62B 3/10* (2006.01)
  *B62B 3/02* (2006.01)
  *B62B 3/00* (2006.01)
  *B62B 5/06* (2006.01)

(52) U.S. Cl.
  CPC ............... *B62B 3/006* (2013.01); *B62B 5/06* (2013.01); *B62B 2203/07* (2013.01); *B62B 2203/70* (2013.01)

(56) References Cited

U.S. PATENT DOCUMENTS

| | | | |
|---|---|---|---|
| 3,190,453 A | 6/1965 | Shelley | |
| 3,357,760 A | 12/1967 | Shelley et al. | |
| 3,454,319 A | 7/1969 | Stentz | |
| 3,869,052 A * | 3/1975 | Leahy | B62B 5/0495 414/401 |
| 3,937,456 A | 2/1976 | Gruodis et al. | |
| 4,398,455 A * | 8/1983 | Merwarth | B65H 33/16 100/14 |
| 4,432,685 A | 2/1984 | Stauber | |
| 4,508,959 A | 4/1985 | Lüscher | |
| 4,957,206 A | 9/1990 | Banko et al. | |
| 5,064,235 A | 11/1991 | Lessard | |
| 5,199,600 A | 4/1993 | Fietsam | |
| 5,387,077 A | 2/1995 | Yatsuka et al. | |
| 5,462,299 A | 10/1995 | Maddux | |
| 5,518,230 A | 5/1996 | Scarlata et al. | |
| 5,647,720 A * | 7/1997 | Golicz | B62B 1/14 414/490 |
| 5,923,529 A | 7/1999 | Mimachi | |
| 6,431,367 B1 * | 8/2002 | Satake | B07B 1/38 209/2 |
| 6,672,601 B1 | 1/2004 | Hofheins et al. | |
| 6,698,770 B2 * | 3/2004 | Eriksson | A61G 12/001 280/33.991 |
| 7,293,785 B2 | 11/2007 | Bush et al. | |
| 7,828,507 B2 | 11/2010 | Honegger | |
| 7,971,875 B2 | 7/2011 | Iino et al. | |
| 8,147,175 B2 | 4/2012 | Brewer, III et al. | |
| 8,911,199 B2 | 12/2014 | Herrmann et al. | |
| 10,654,504 B1 * | 5/2020 | Lee | B65H 31/30 |
| 2003/0077161 A1 * | 4/2003 | Weiss | B62B 3/04 414/663 |
| 2003/0091414 A1 * | 5/2003 | Dehn | B62B 3/04 414/396 |
| 2003/0102644 A1 | 6/2003 | Figueroa | |
| 2005/0226708 A1 * | 10/2005 | Brown | B62B 3/04 414/482 |
| 2013/0093135 A1 | 4/2013 | Park et al. | |

FOREIGN PATENT DOCUMENTS

| | | |
|---|---|---|
| FR | 2840170 A1 | 12/2003 |
| JP | 01167121 A | 6/1989 |

OTHER PUBLICATIONS

Carlisle C2236H03 Polypropylene Rack Dolly With Handle.
Noble Products Gray Dish Rack and Glass Rack Dolly.
Cambro https://assets.centralrestaurant.com/pdfs/specsheets/250-553.pdf.

* cited by examiner

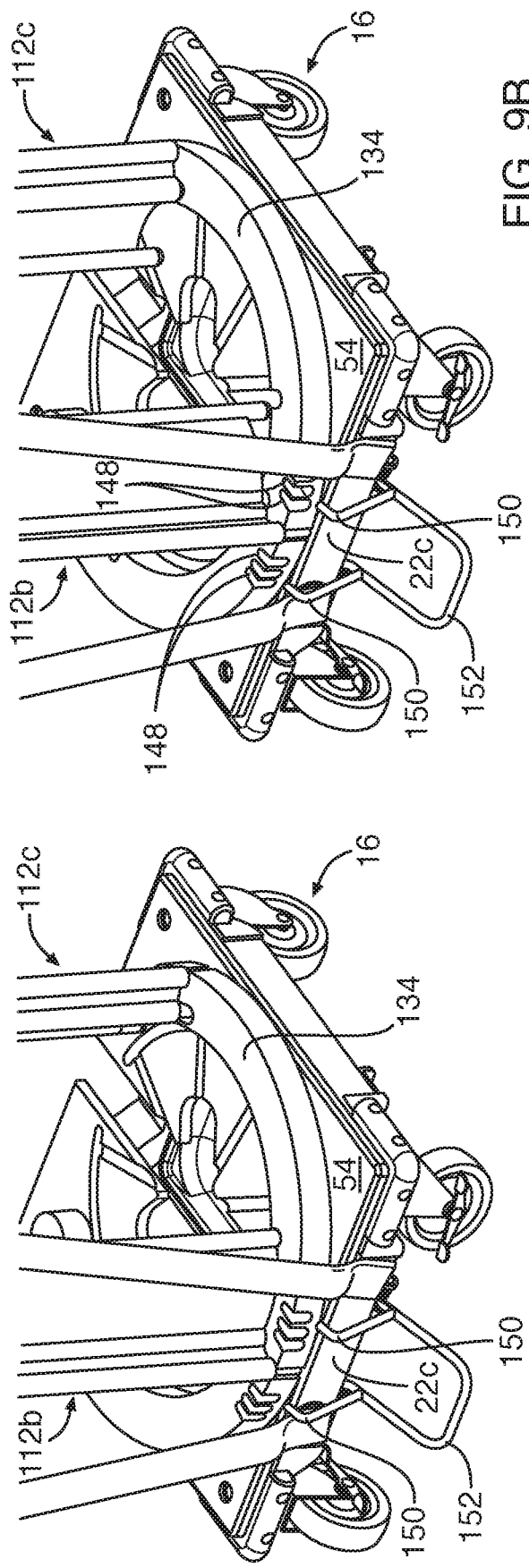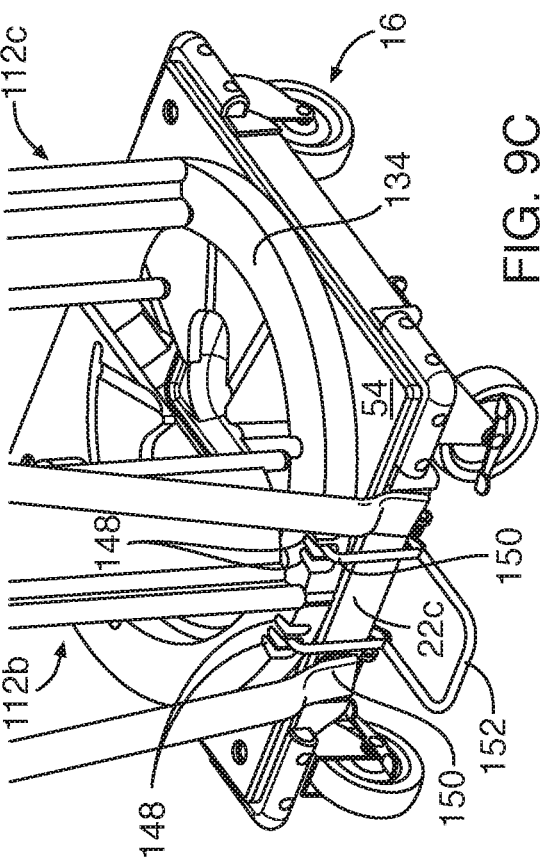

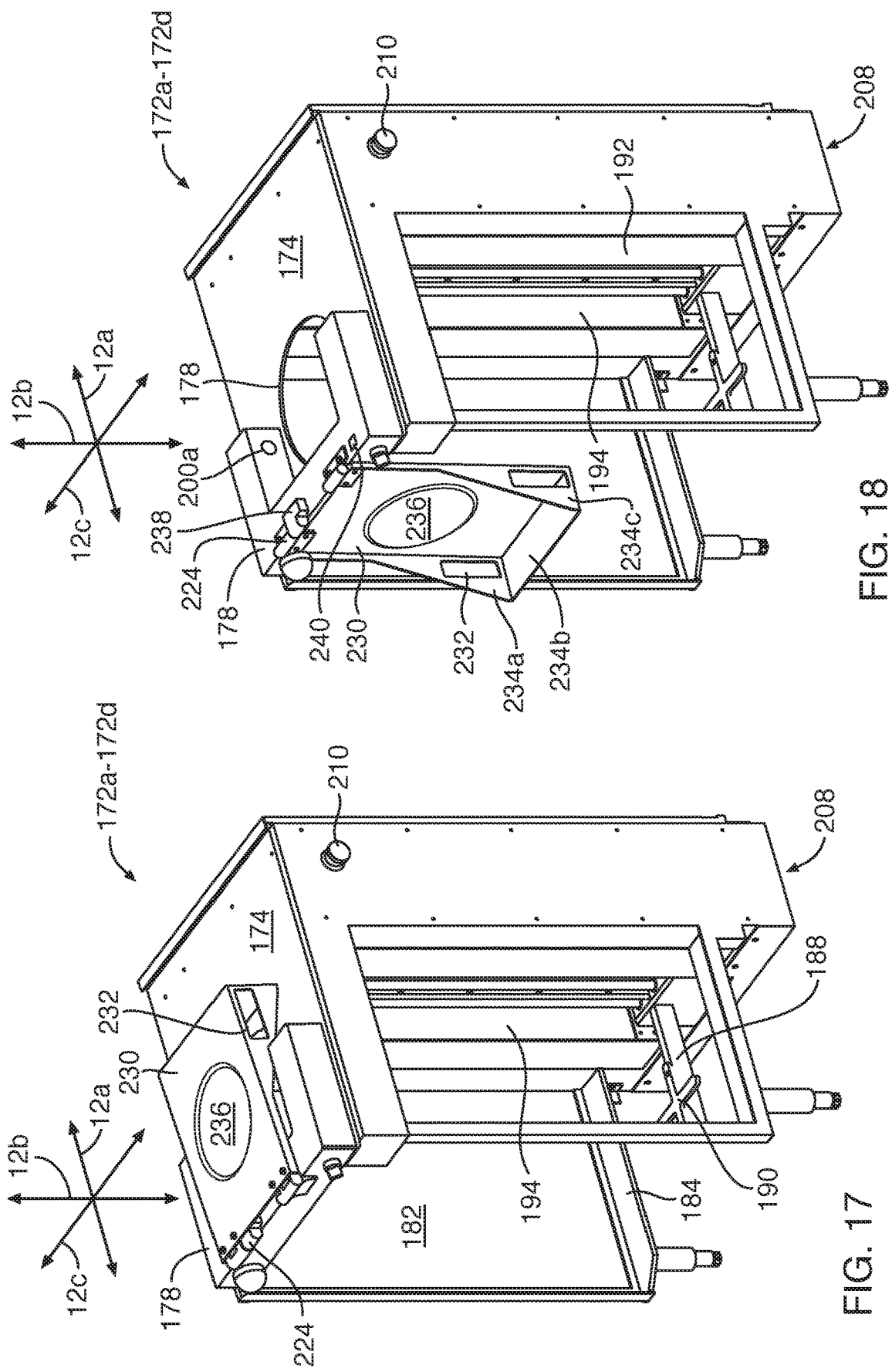

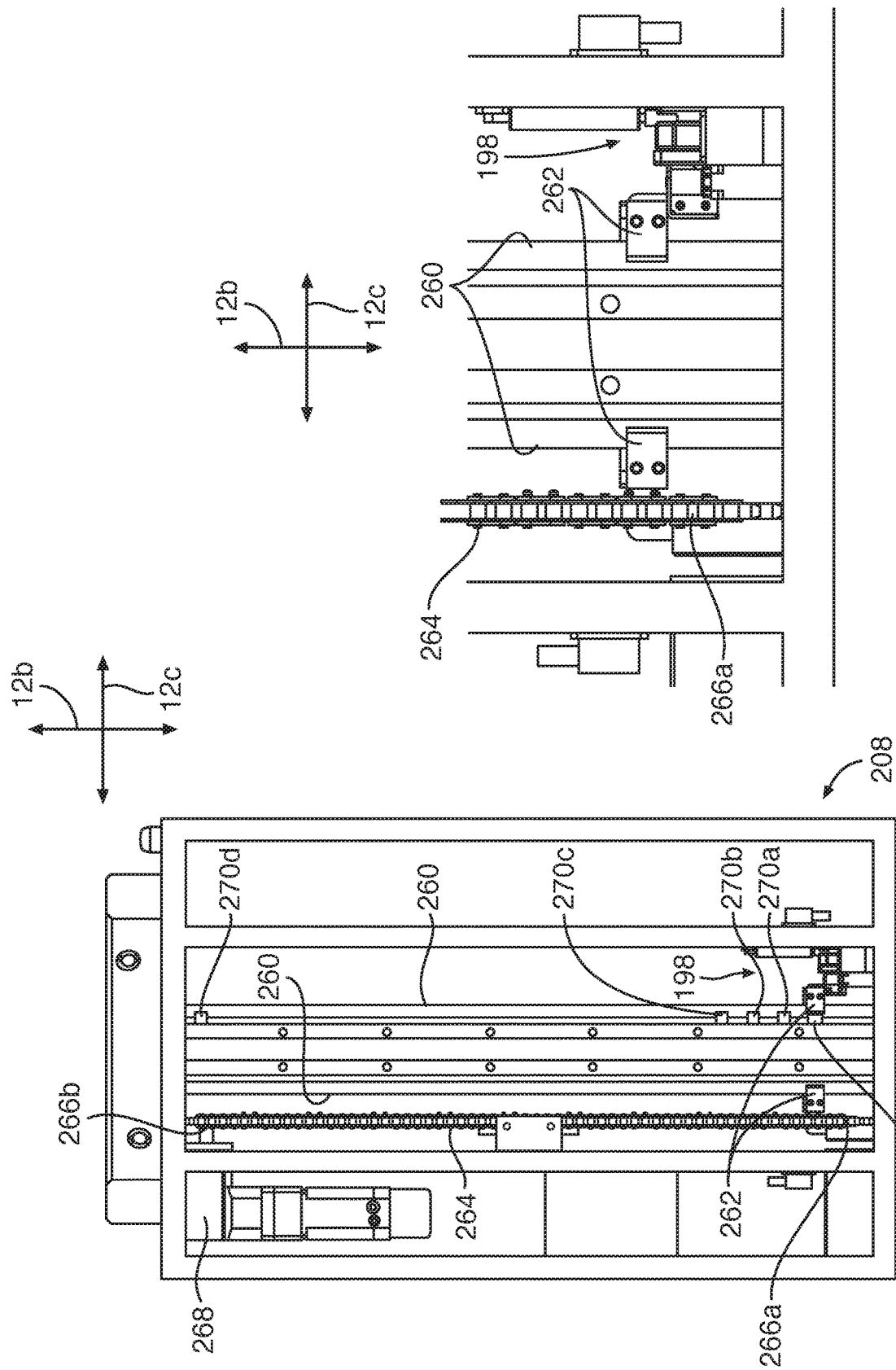

DISH STACKING CART

BACKGROUND

Field of the Invention

This invention relates to carts and other systems for handling dishes.

Background of the Invention

Many restaurants serve patrons on reusable plates, bowls, silverware, and other serving dishes. Although this reduces the environmental impact of single-use plastic products, cleaning the dishes is a labor intensive process.

What is needed is an improved approach for handling dishes for use in restaurants and other food-service applications.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 9A to 9C are partial isometric views of the dish cart of FIG. 7;

FIG. 17 is an isometric view of a dish drop station having a lid in accordance with an embodiment of the present invention;

FIG. 18 is an isometric view of the dish drop station of FIG. 18 having the lid open;

FIGS. 22 and 23 are front views of a lift mechanism for a dish drop station in accordance with an embodiment of the present invention;

DETAILED DESCRIPTION

Figure 1:
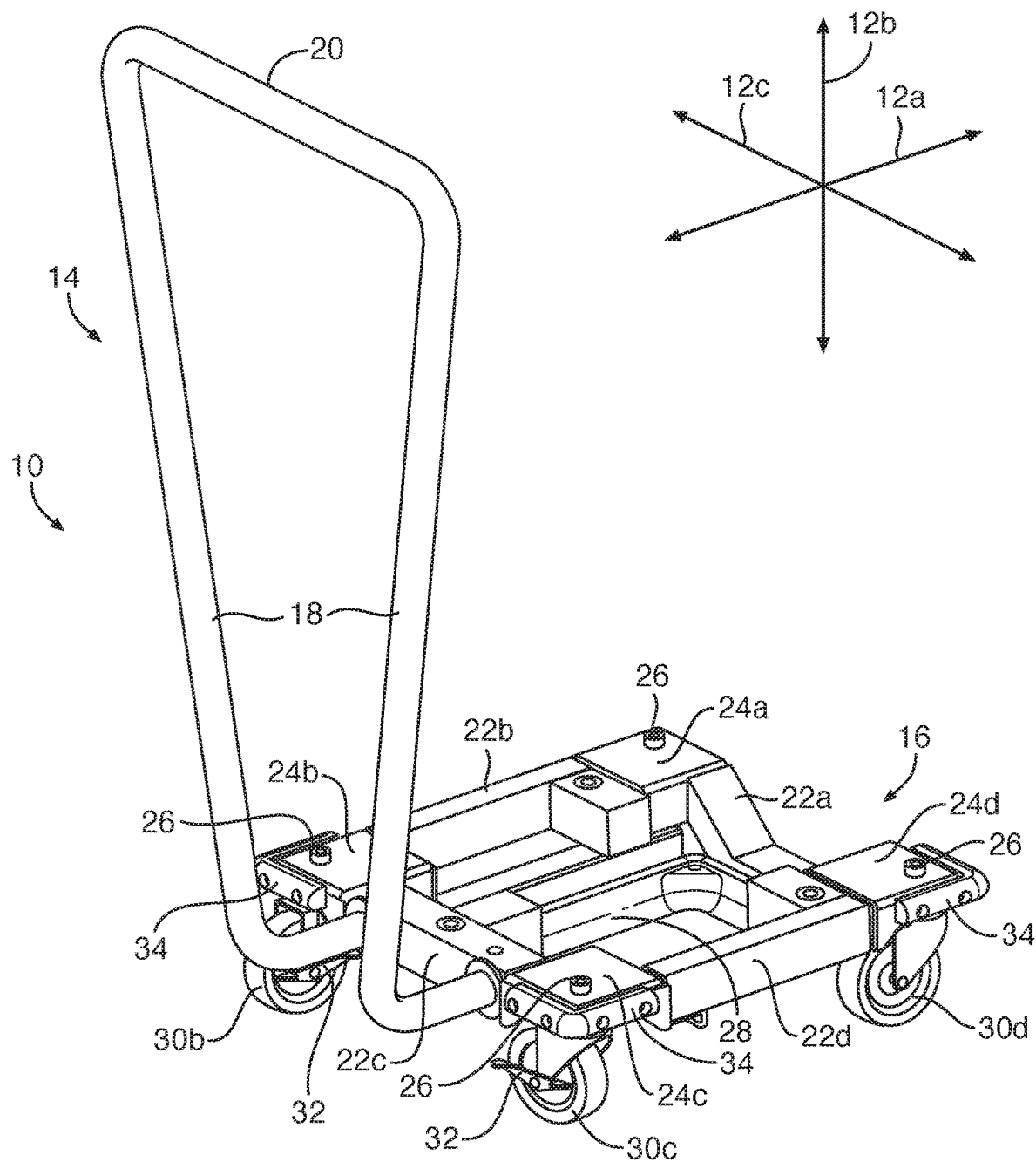
FIG. 1 is an isometric view of a cart in accordance with an embodiment of the present invention.

Referring to FIG. 1, a cart 10 may be understood with respect to a longitudinal direction 12a, vertical direction 12b, and horizontal direction 12c that are all mutually perpendicular to each other.

The cart 10 includes a handle 14 and a base 16. The handle 14 includes vertical bars 18 that extend upwardly from the base 16 in the vertical direction 12b, though they may also be angled such that they extend outwardly from a point of attachment to the base in one or both of the longitudinal and horizontal directions 12a, 12c. A horizontal bar 20 secures to tops of the vertical bars 18 and is preferably at a convenient height to be grasped and pushed by a user. In the illustrated embodiment, the bars 18, 20 are one monolithic tube bent into the illustrated shape.

The base 16 may include a frame composed of frame members 22a, 22b, 22c, 22d such that each frame member has the long dimension thereof substantially (within 5 degrees) parallel to one side of a quadrilateral shape, such as a square or rectangle. For example, frame members 22a and 22c are offset from one another along the longitudinal direction 12a and have the long dimension thereof oriented substantially parallel to the horizontal direction 12c. Likewise, frame members 22b and 22d are offset from one another along the horizontal direction 12*c* and have the long dimension thereof oriented substantially parallel to the longitudinal direction 12*a*.

As shown, the frame member 22*a* at a front of the base 16 is bent or cutaway at a middle portion thereof such that an upper surface of a middle portion of frame member 22*a* is below upper surfaces of the other frame members 22*a*, 22*b*, 22*c*. As discussed below, this bent or cutaway middle portion enables insertion of a lift arm for supporting dishes or racks stacked onto the cart 10 according to the approach described herein.

In the illustrated embodiment, corner piece 24*a* is secured to frame member 22*a* and 22*b*, corner piece 24*b* is secured to frame members 22*b* and 22*c*, corner piece 24*c* is secured to frame members 22*c* and 22*d*, and corner piece 34*d* is secured to frame members 22*d* and 22*a*. In some embodiments, the corner pieces 24*a*-24*d* for part of the frame such that the frame members 22*a*-22*d* are secured to one another exclusively due to their securement to the corner pieces 24*a*-24*d*. The corner pieces 24*a*-24*d* define upper surfaces that are substantially parallel to the longitudinal and horizontal directions 12*a*, 12*c*.

The corner pieces 24*a*-24*d* may define structures for securing a top plate or other platform to the base 16 for supporting stacked items such as dishes, dish racks, or other stackable items. In the illustrated embodiment, the structures are posts 26 that may insert within corresponding openings in a platform placed over the base 16. The posts 26 may include openings for receiving fasteners for securing the platform to the base 16. In other embodiments, the corner pieces 24*a*-24*d* include openings for receiving fasteners and the posts 26 are omitted.

In the illustrated embodiment, the base 16 further includes a lower frame 28 secured to the frame members 22*a*-22*d*. The lower frame 28 may define rails configured to removably support a drip pan positioned under the frame formed by frame members 22*a*-22*d*.

Wheels 30*a*-30*d* may secure to the corner pieces 24*c*-24*d*. Fourth wheel (see, e.g., wheel 30*a* in FIG. 6) secures to corner piece 24*a* in a like manner. In the illustrated embodiment, the wheels 30 may be caster wheels that are able to swivel about an axis substantially parallel to the vertical direction 12*b* relative to the structure to which they are mounted in addition to rolling along a horizontal support surface. In the illustrated embodiment, wheels 30*d* and the wheel secured to corner piece 24*a* (see 30*a* in FIG. 6) are fixed such that their axes of rotation are substantially parallel to the horizontal direction 12*c*. In contrast, wheels 30*b* and 30*c* are swivel-mounted to the corner pieces 24*b*, 24*c*. In the illustrated embodiment, wheels 30*b*, 30*c* further include locks 32 that may be selectively engaged by a user to hinder rotation of the wheels 30*b*, 30*c*. In other embodiments, locks 32 are additionally or alternatively coupled to the wheels 30*a*, 30*d*. In still other embodiments, wheels 30*a*, 30*d* include locks 32 and have a fixed orientation whereas the wheels 30*b*, 30*c* are free to swivel and lack locks 32

In some embodiments, bumpers 34 made of plastic, rubber, or other resilient material are mounted to the corner pieces 24*a*-24*d*, e.g. the outward facing two sides of the corner pieces 24*a*-24*d* in order to reduce damage caused by impacts.

Figure 3:
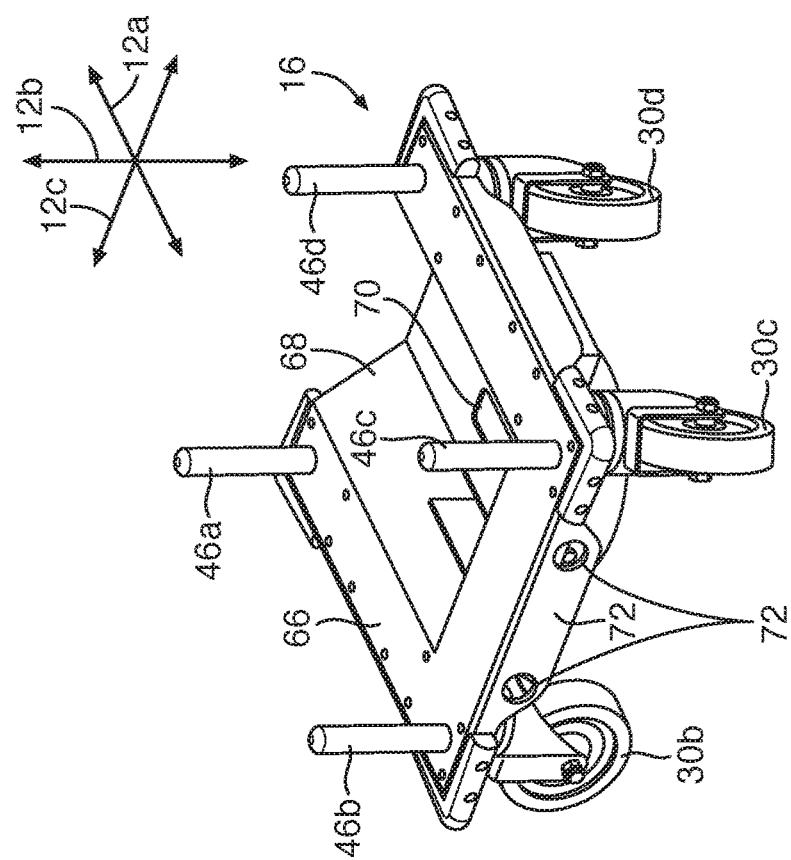
FIG. 3 is an isometric view of a dish cart base for use with the upper frame of FIG. 2 in accordance with an embodiment of the present invention.
Figure 2:
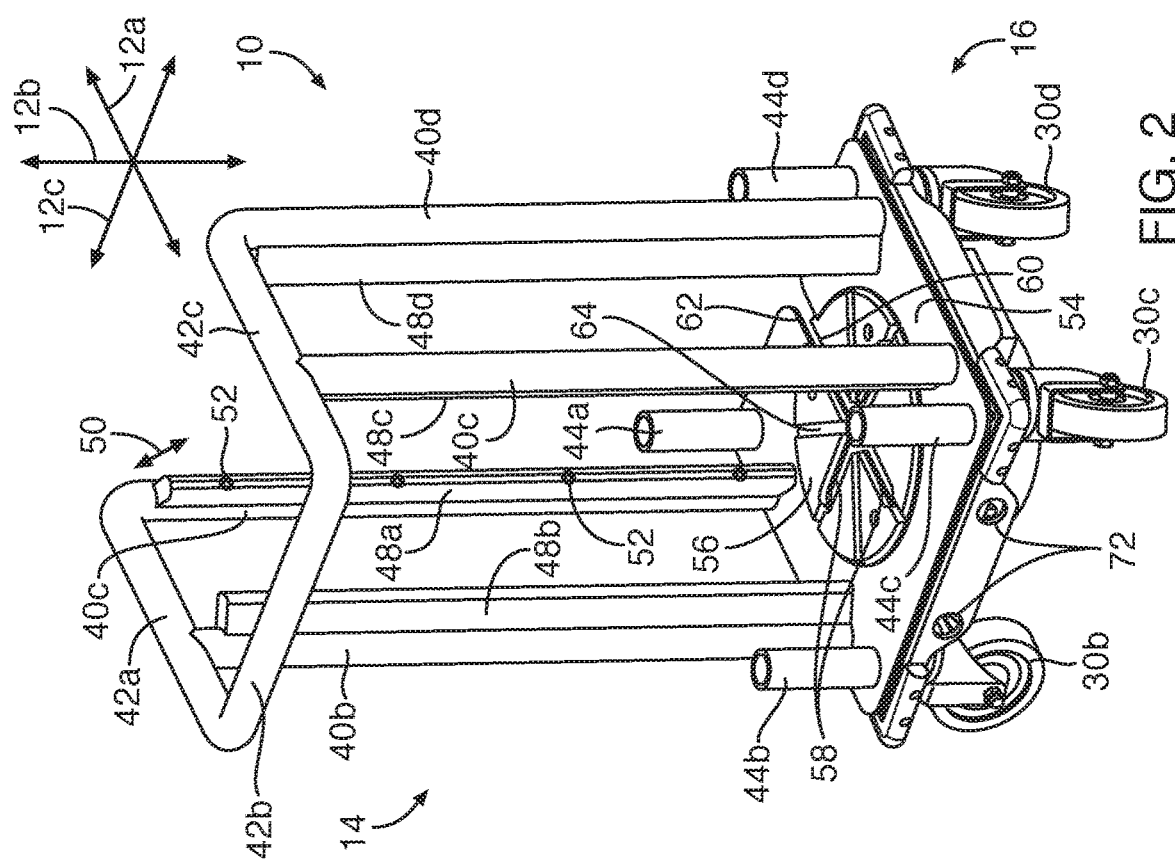
FIG. 2 is an isometric view of a dish cart including an alternative upper frame in accordance with an embodiment of the present invention.

Referring to FIGS. 2 and 3, in some embodiments a cart 10 may be augmented with additional structures to function as a dish cart. In FIGS. 2 and 3, the dish cart 10 includes a handle 14 having the illustrated configuration, including four vertical posts 40*a*-40*d* that extend upwardly from the base 16 substantially parallel to the vertical direction 12*b*.

The posts 40*a*-40*d* may be arranged in a quadrilateral shape, i.e. such that central axes of the posts 40*a*-40*d* are positioned on corners of a quadrilateral shape such as a square or rectangle. In some embodiments, the posts 40*a*-40*d* are at corners of a parallelogram to facilitate proper alignment of the top and bottom. In some embodiments, only three posts are used, rather than 4.

The handle 14 may further include one or more bars 42*a*-42*c* that extend substantially parallel to either the longitudinal direction 12*a* or the horizontal direction 12*c*. For example, in the illustrated embodiment, bar 42*a* and is secured to vertical posts 40*a* and 40*b* and has the long dimension thereof substantially parallel to the longitudinal direction 12*a*. Likewise, bar 42*c* has its long dimension substantially parallel to the longitudinal direction is secured to vertical posts 40*c* and 40*d*. The bar 42*b* is connected to the bars 42*a* and 42*c* and provides a handle at a convenient height for pushing the cart 10. In the illustrated embodiment the posts 40*a*-40*d* and bars 42*a*-42*c* are all embodied as hollow tubes made of a sufficiently strong material such as steel or aluminum. In the illustrated embodiment, bars 42*a*-42*c* and vertical posts 40*a*, 40*d* are made of a one tube bent in the illustrated shape.

In the embodiment of FIGS. 2 and 3, the handle 14 secures to the base 16 by means of tubes 44*a*-44*d* that fit over corresponding posts 46*a*-46*d* secured to the base 16. In some embodiments, no further fastening is used, i.e. the weight of the handle 14 and the length of the tubes 44*a*-44*d* and posts 46*a*-46*d* is relied upon to prevent accidental removal. Posts 46*a*-46*d* may secure to the base 16 using the posts 26 or in place of the posts 46*a*-46*d*.

In the embodiment of FIGS. 2 and 3, rails 48*a*-48*d* secure to some or all of the posts 40*a*-40*d* and extend radially inwardly to a common central point such that there is a radial extent 50 of each rail 48*a*-48*d*. The radial extent 50 of the rails 48*a*-48*d* is chosen to define the diameter of items that will fit stacked on the base among the rails 48*a*-48*d*. For example, a cart 10 may come with multiple sets of rails, each set including four rails 48*a*-48*d* that have extents 50 defining a diameter when secured to the posts 40*a*-40*d*, the diameter defined by each set being different. In this manner, by installing different sets of rails, the cart may be configured to stack different sizes of dishes, e.g., dinner plates, salad plates, dessert plates, bowls, etc.

In the illustrated embodiment, each rail 48*a*-48*d* mounts to its corresponding post 40*a*-40*d* by means of fasteners 52, such as screws, bolts, or other type of fastening means. The rails 48*a*-48*d* preferably define countersunk apertures for receiving such fasteners 52 in such that heads of screws or bolts do not contact stacked items on the cart 10.

In the illustrated embodiment, the posts 40*a*-40*d* and tubes 44*a*-44*d* are fastened to a plate 54, such as by means of welding, screws, bolts, or other fastening means. For example, the plate 54 may be made of the same material (steel, aluminum) as the posts 40*a*-40*d* and the tubes 44*a*-44*d*. The plate 54 may define apertures aligned with channels defined by the tubes 44*a*-44*d* such that the posts 46*a*-46*d* may pass through the plate 54 to insert within the tubes 44*a*-44*d*.

In some embodiments, a pad 56 secures to the plate 54 to provide a softer support surface for dishes stacked on the base 16. For example, the pad 56 may be embodied as a circular plastic piece fastened to the plate 54 by means of screw, adhesive, clips, or some other fastening means. As is apparent in FIG. 2, the pad 56 defines various openings 58. The plate 56 defines corresponding openings aligned with the openings 58. The openings 58 may be lobe openings 58 having a size configured to allow a multi-lobed lift paddle to pass through the pad 56 and plate 54, as will be discussed in greater detail below. The pad 56 may further define a slot 60 aligned with a corresponding slot 62 in the plate 54 for permitting through passage of a lift arm secured to the lift paddle. As is apparent in FIG. 2, the slot 60 extends completely to the edge of the pad 56 and the slot 62 in the plate 54 extends completely to the front edge of the plate 54. The slot 62 extends to the edge of the plate 54 and may be positioned over the frame member 22*a* that includes the bent or cutaway portion for receiving the lift paddle and lift arm. In particular, a gap may be defined between the bottom surface of the plate 54 and the bent or cutaway portion of the frame member 22*a* for receiving the lift paddle and lift arm.

In some embodiments, the pad 56 further defines grooves 64 extending radially inward to the openings 58 and/or slot 60. In this manner, material and fluid from dishes stacked in the cart is guided to the openings 58 and/or slot 60.

Referring specifically to FIG. 3, in some embodiments, the base 16 includes a lower plate 66 mounted to the frame members 22*a*-22*d* and/or corner pieces 24*a*-24*d* or used in place of the frame members 22*a*-22*d* and corner pieces 24*a*-24*d*. The posts 46*a*-46*d* may be welded or otherwise fastened to the lower plate 66. As is apparent, an inner portion of the lower plate 66 defines an indentation or depression 68 that extends to the front edge of the base 16 over the frame member 22*a* such that the lift paddle and lift arm may insert between the indentation 68 and plate 54 and subsequently be lifted up through the slots 60, 62 and lobe openings 58 as described in greater detail below. The lift paddle and lift arm may likewise pass down through the slots 60, 62 and lobe openings 58 and the lift paddle and the lift arm may be withdrawn from the gap between the plate 54 and indentation 68 as is also described in greater detail below.

Note that in the illustrated embodiment, the base 16 further defines apertures 72 in frame member 22*c* for receiving a handle 14 having the form shown in FIG. 1. In other embodiments, such apertures 72 may be omitted.

Figure 4:
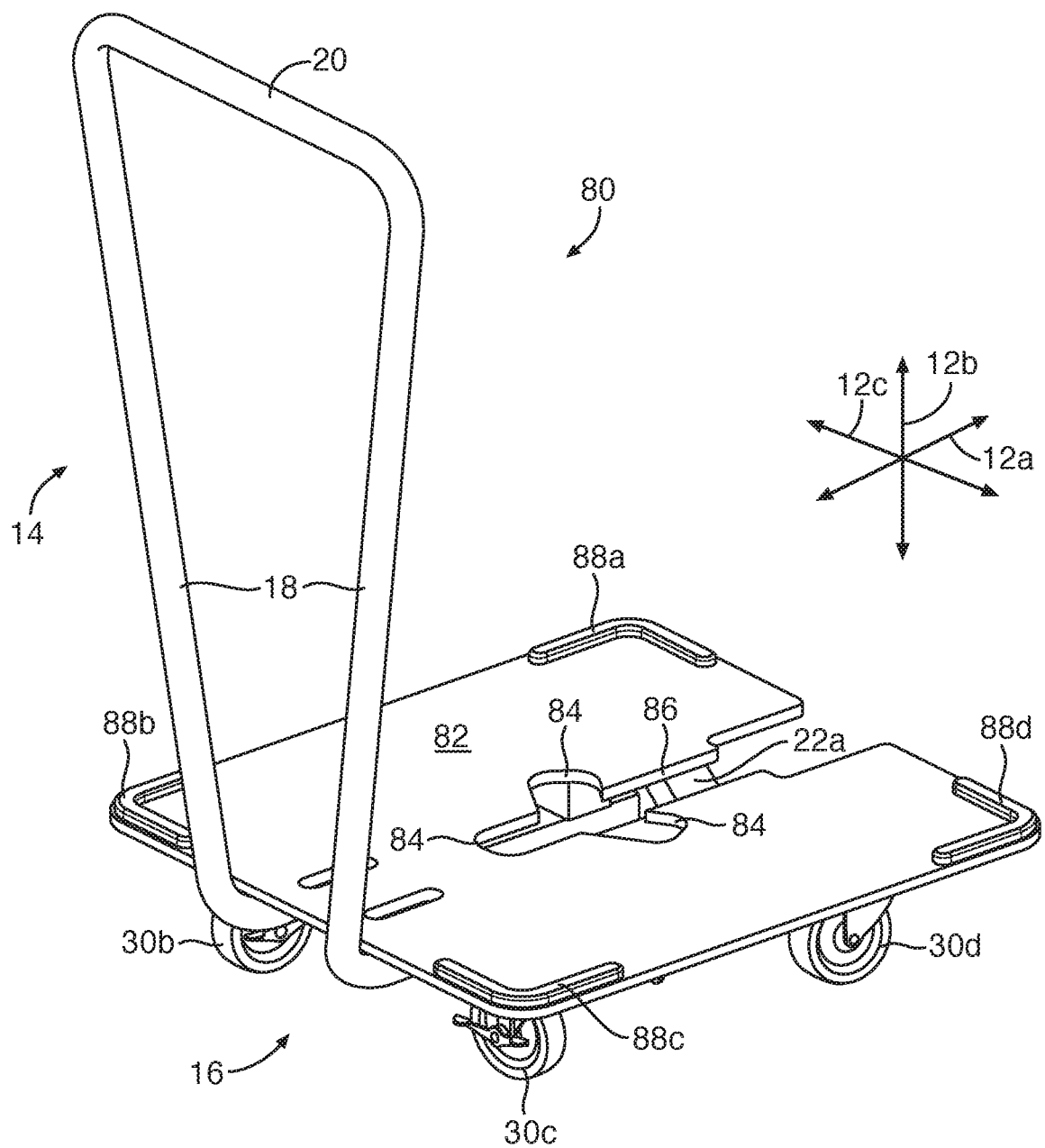
FIG. 4 is an isometric view of a rack cart in accordance with an embodiment of the present invention.

FIG. 4 illustrates a rack cart 80 that may be modified relative to the cart 10 of FIG. 1 to function as a rack cart as described below. In other instances, the cart 10 of FIG. 1 may be used as a rack cart without further modification. In the embodiment of FIG. 4, a plate 82 may be mounted to the frame members 22*a*-22*d* and/or corner pieces 24*a*-24*c*. The plate 82 includes lobe openings 84 sized to permit passage therethrough of the lobes of a lift paddle. A slot 86 likewise extends from the front edge of the plate over the frame member 22*a* and connects to the lobe openings 84 such that the lift paddle and lift arm may pass through the lobe openings 84 and slot 86.

In the illustrated embodiment, corner projections 88*a*-88*d* are located at the corners of the plate 82, which is quadrilateral in shape but for rounding at the corners, with sides of the quadrilateral shape being parallel to one of the longitudinal direction 12*a* and the horizontal direction 12*c*. Each corner projections 88*a*-88*d* extend from one rounded corner of the quadrilateral shape and partially along two adjoining sides of the quadrilateral shape and likewise extend upwardly along the vertical direction 12*b*. The corner projections 88*a*-88*d* are sized to fit within corresponding recesses in a dish rack according to any shape known in the art such that the rack cart 80 is enabled to securely stack dish racks, glass racks, trays, or other types of racks known in the food service industry.

Figure 5:
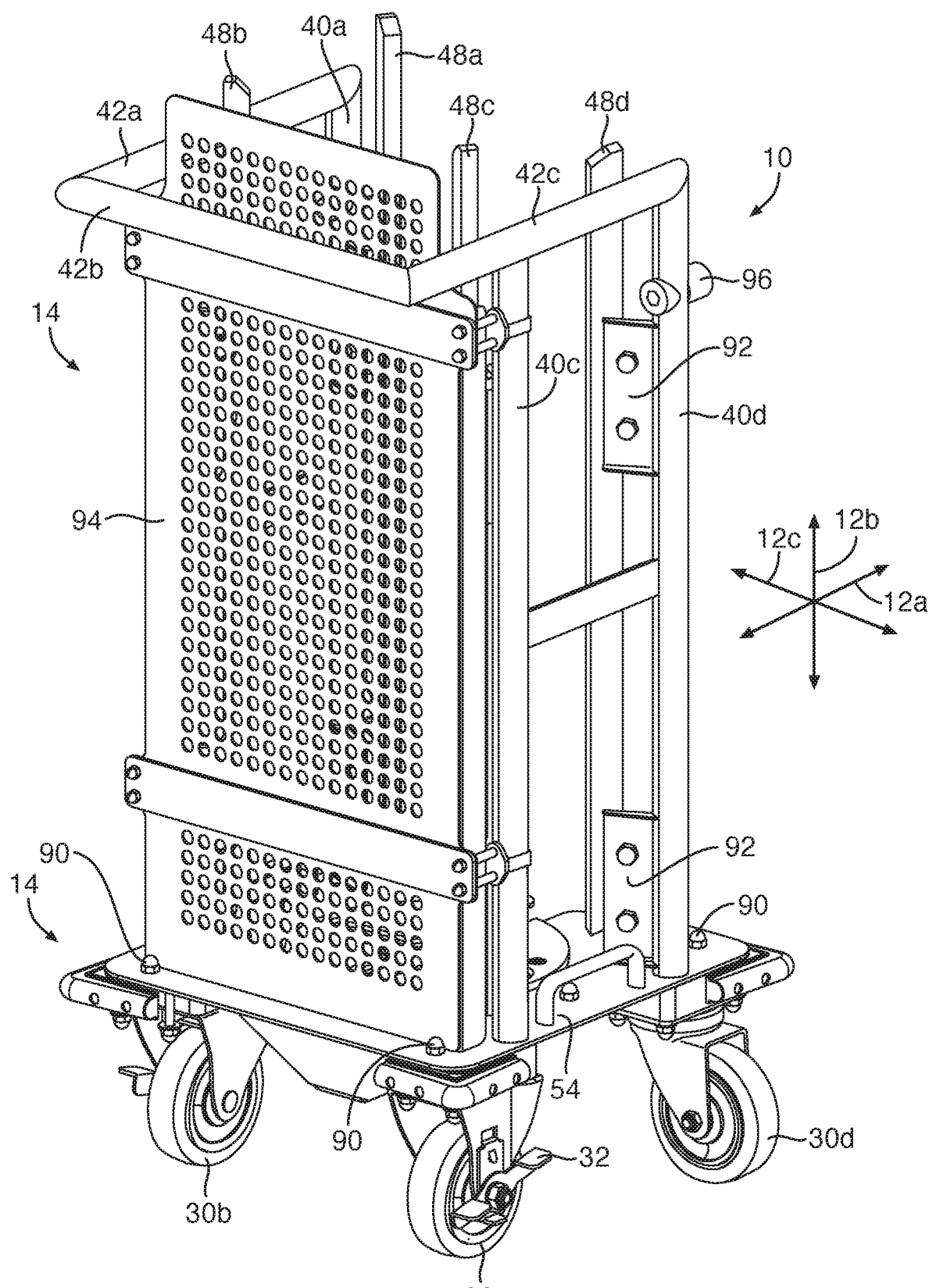
FIG. 5 is an isometric view of an alternative embodiment of a dish cart in accordance with an embodiment of the present invention.
Figure 6:
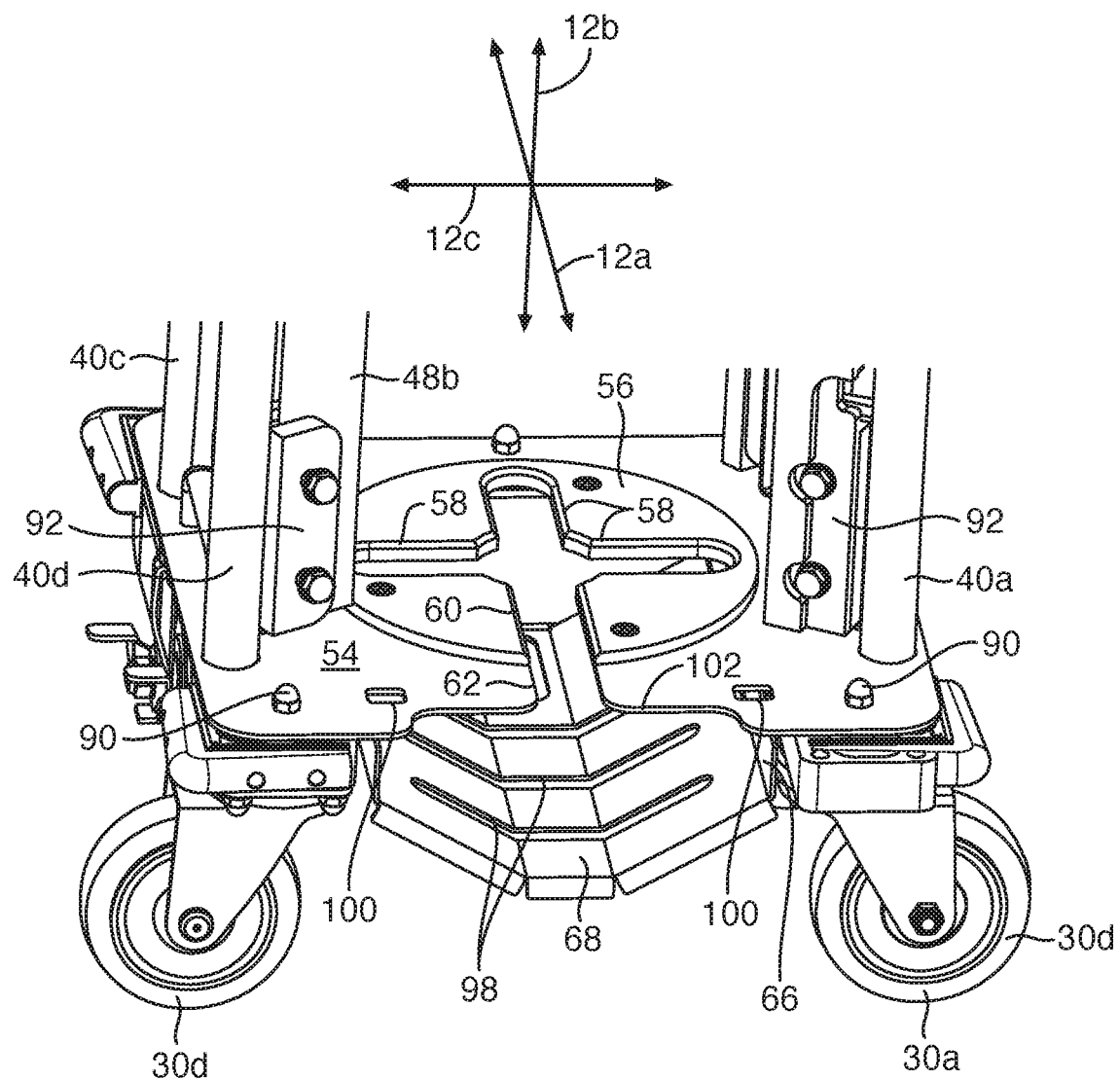
FIG. 6 is a partial isometric view of the dish cart of FIG. 5.

FIGS. 5 and 6 illustrate an alternative embodiment of a dish cart 10. In particular, in the illustrated embodiment, the top plate 54 is fastened to the corner pieces 24*a*-24*d* by means of bolts 90, such as by securing to the posts 26 on the corner pieces 24*a*-24*d* or openings for receiving the bolts 90 formed on another portion of the base 16.

FIG. 5 further illustrates an alternative approach for securing the rails 48*a*-48*d* to the posts 40*a*-40*d*. In particular, each post may have one or more flanges 92 secured thereto and extending radially inwardly into the cart 10. The rails 48*a*-48*d* may then secure to these flanges 92 by means of bolts, screws, or some other fastening means. As for the embodiment of FIGS. 2 and 3, different sets of rails 48*a*-48*d* may secure to the flanges 92 in order to adjust the size of dishes that will fit among the rails 48*a*-48*d*.

In the embodiment of FIG. 5, a screen 94, which may be a solid or perforated piece of material, such as metal or plastic, secures to the posts 40*b*, 40*c* such that the screen is secured to the cart 10 opposite the front edge of the cart 10. Accordingly, the screen 94 may block scattering of material out of the back of the cart 10 during use. The screen may be detachable and may be one of multiple screens having multiple colors such that the color of the screen attached to a cart indicates the contents of the cart, e.g., size of dishes loaded or able to be loaded into cart or a state of the dishes in the cart (clean or dirty)

In the embodiment of FIG. 5, metal lugs 96 secure to one or both of the posts 40*a*, 40*d* such that the metal lugs extend forwardly from the posts 40*a*-40*d* outwardly from the front of the cart 10 and substantially parallel to the longitudinal direction 12*a*. The metal lugs 96 may further have a face substantially parallel to the vertical and horizontal directions 12*b*, 12*c*. As discussed below with respect to FIG. 29, the metal lugs may facilitate securement of the cart by a magnetic detent.

Referring specifically to FIG. 6, the lower plate 66 may have various configurations. In the illustrated embodiment, the indentation 68 or depression in the lower plate 66 defines various slits 98 to facilitate drainage, such as slits oriented substantially parallel to the horizontal direction 12*c*.

Note further that in some embodiments where the handle 14, such as the posts 40*a*-40*d* and horizontal bars 42*a*-42*c* are secured (e.g., welded) to the top plate 54, the top plate 54 may function as the frame for the base 16 such that frame members 22*a*-22*d* are omitted and the corner pieces 24*a*-24*d* with the wheels 30*a*-30*d* secure only to the plate 54. Alternatively or additionally, the lower plate 66 may secure to the corner pieces 24*a*-24*d*, such as interposed between the upper plate 54 and the corner pieces 24*a*-24*d*.

As for other embodiments, the upper plate 54 of FIG. 6 includes lobe openings 58 for receiving a lift paddle and a slot 62 extending completely to the front edge of the top plate 54. Various configurations for a lift paddle are possible, such as a three lobe design or a four lobe design. In the embodiment of FIG. 6, a four lobe design is used that has four-fold symmetry, each lobe being rotated 90 degrees relative to an adjacent lobe. Accordingly, only three lobe openings 58 are used with the fourth lobe being aligned with the slot 62 and passing therethrough along with the lift arm to which the lift paddle is secured.

In other embodiments, such as shown in FIG. 4, the lift paddle has three lobes with three-fold symmetry such that each arm is rotated 120 degrees relative to the other lobes. As shown in FIG. 4, one lobe opening 84 is oriented parallel to the slot 86. The three-lobe design may also be used for the carts 10 of FIGS. 1-3, 5, and 6 as well.

The embodiment of FIGS. 5 and 6 and any of the embodiments of FIGS. 1-4 may further include structures for locking the cart 10 into a dish drop station as discussed in greater detail below. In the illustrated embodiment, the upper plate 54 includes apertures 100 for receiving a cart lock, the aperture 100 being positioned over the gap defined by the upper plate 54 and the lower plate 66 and being located closer to the front edge 100 than any other edge of the plate 54. Corresponding apertures 100 may be positioned at the front edge of the base of any of the embodiments of FIGS. 1-4 as well. In some embodiments, only a single aperture 100 is used.

In some embodiments, the plate 504 includes an indentation 102, such as for providing clearance for a drive mechanism of a lift arm according to the embodiments of dish drop stations described below.

Dish carts according to the embodiments disclosed herein may further include structures such as hooks and receptacles for hooks that enable dish carts to be hooked to one another to facilitate transportation by a single person as a group.

Figure 7:
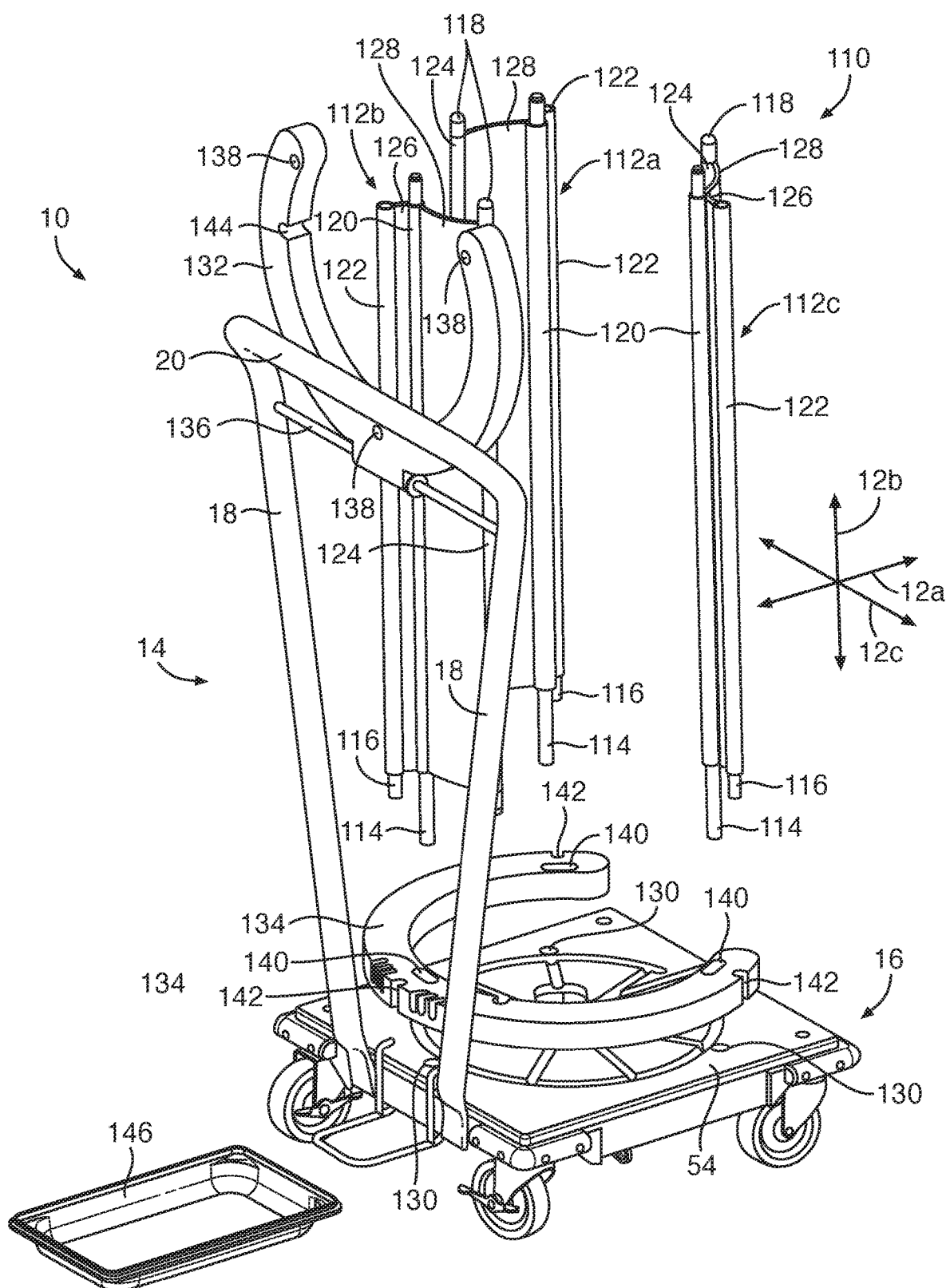
FIG. 7 is an exploded view of an adjustable upper frame for a dish cart in accordance with an embodiment of the present invention.

Referring to FIG. 7, a cart 10 may be embodied as a dish cart including an adjustment assembly 110. For example, the adjustment assembly 110 may be used to modify the dish cart 10 to stack dishes of different sizes. Accordingly, the adjustment assembly 110 may take the place of differently sized sets of rails 48a-48d. The adjustment assembly 110 may be used to adapt cart 10 such as that shown in FIG. 1 that lacks the vertical posts 40a-40d. Alternatively, the vertical posts 40a-40d of a cart 10 as shown in FIGS. 2-3 and 5-6 may provide room for the adjustment assembly 110.

The adjustment assembly 110 may include a plurality of vanes 112a-112c that are rotatable about axes substantially parallel to the vertical direction 12b. In this manner, the area within the vanes 112a-112c that is not obstructed by the vanes 112a-112c may be varied in order to accommodate dishes of different sizes.

In the illustrated embodiment, each vane 112a-112c may include a first rod 114 that is rotatably pinned to the base 16 and a second rod 116 that is coupled to the other rods 116 such that rotation of one vane 112a-112c about its rod 114 will cause the other rods 112a-112c to rotate about their corresponding rods 114.

The vanes 112a-112c may further include a third rod 118 at an inner edge of the vane 112a-112c in order to provide rigidity to the vanes 112a-112c. In the illustrated embodiment, the vanes 112a-112c each include a first sleeve 120 receiving the first rod 114, a second sleeve 122 receiving the second rod 116, and a third sleeve 124 receiving the third rod 118.

The vanes 112a-112c may further include a web 126 extending between the first sleeve 120 and the second sleeve 122 and a web 128 extending between the first sleeve 120 and the third sleeve 124. As is apparent in FIG. 7, the sleeves 120-124 and the webs 126, 128 may be monolithically formed with one another such as by co-molding or extrusion as a single member. As is also apparent in FIG. 7, the sleeves 120-124 and the webs 126, 128 have a substantially (within 2 mm) constant cross section along the vertical direction 12b in the illustrated embodiment.

In use, the web 128 extends inwardly with the amount by which it extends inwardly varying as the vanes 112a-112c are rotated. The presence of the third rod 118 resists bending of the inner edge of the web 128. As is apparent, the web 128 is curved such that a concave inner surface of the web 128 faces toward a center of the base when the web 128 is pivoted outwardly to accommodate large dishes, the web 128 will not interfere with dishes stacked among the vanes 112a-112c. In some embodiments, the web 128 does not contact dishes at any of its possible orientations. Instead, dishes are only contacted by the sleeve 124 in which the rod 118 is inserted.

In the illustrated embodiment, the first rods 114 insert within apertures 130 formed in the top plate 54. For example, the apertures 130 may be distributed at 120 degree intervals about a point on the plate 54 such that one aperture 130 is substantially (within 1 cm) aligned with a center of the slot 62 along the horizontal direction 12c but positioned closer to the rear edge than to the front edge of the base 16 such the slot 62 does not intersect this aperture 130.

As is apparent in FIG. 7 each rod 114 protrude both above and below the webs 126, 128 of the vane 112a-112c in which it is located. In some embodiments, the portions of the rod 114 protruding above and below the webs 126, 128 are a single rod whereas in other embodiments they are separate rods.

In the illustrated embodiment, the second rod 116 protrudes only below the webs 126, 128 and may extend along the entire extent of the second sleeve 122 or only partially through the sleeve 122.

The third rod 118 may either not protrude from the third sleeve 124, protrude both above and below the third sleeve 124, or protrude only one of above and below the third sleeve 124. In the illustrated embodiments, portions of the third rod 118 that protrude above or below the third sleeve 124 are covered with caps made of a material that is softer than the metal (e.g., steel) of which the rods 114-118 may be formed. For example, the caps may be made of a resilient polymer or rubber to avoid damaging dishes placed among the vanes 112a-112c. The caps may likewise prevent insertion of the third rod 118 into the apertures intended to receive the first or third rod.

Note further that the first rod 114 extends below the first sleeve 120 a greater extent than second third 116 extends below the second sleeve 122 in the illustrated embodiment. In this manner, when the first rod 114 of a vane 112a-112c is inserted in an aperture 130, the downward protruding portion of the second rod 116 will remain above the bottom plate 54 and the pad 56 such that it does not hinder pivoting of the vane 112a-112c.

Figure 8:
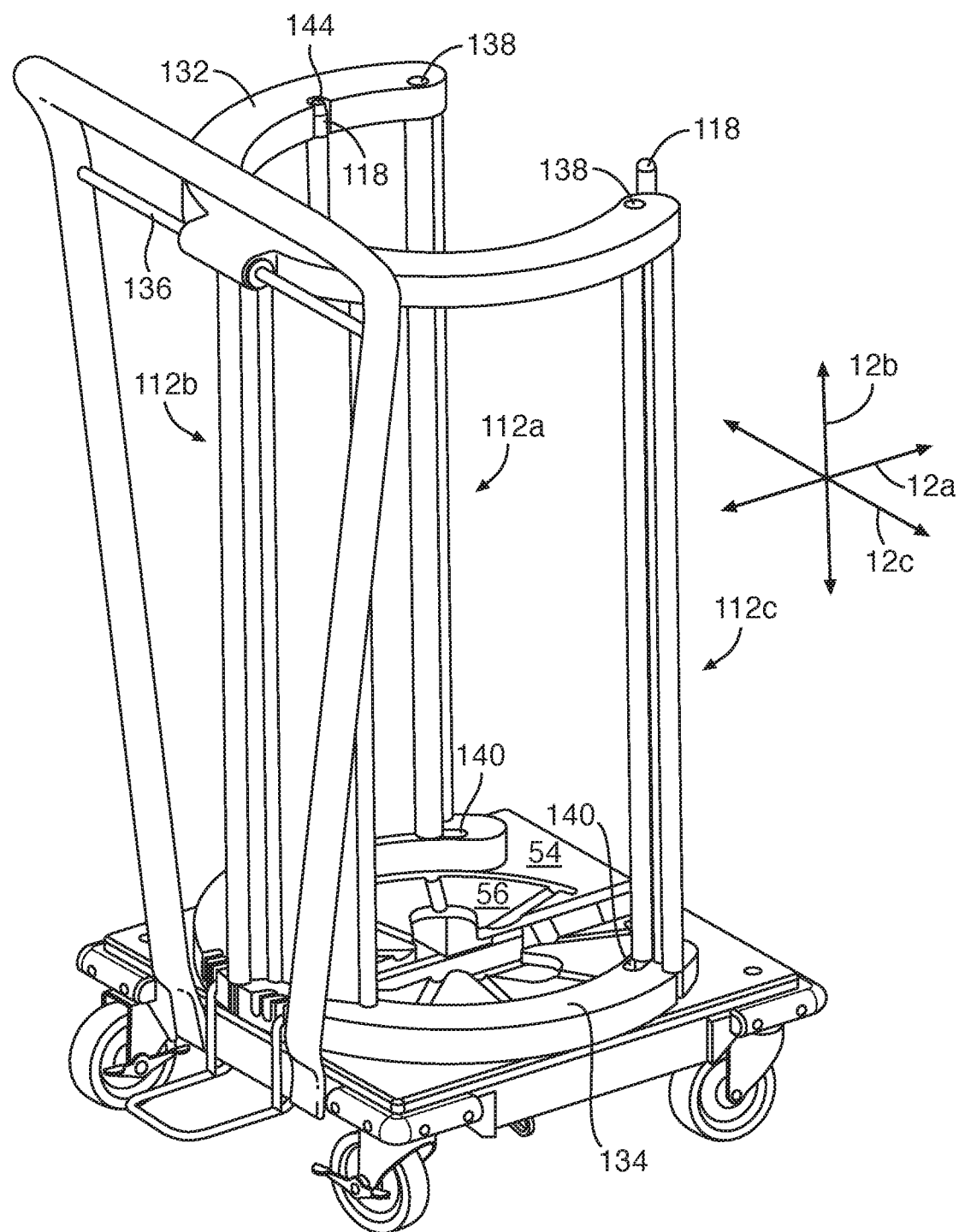
FIG. 8 is an assembled isometric view of the dish cart of FIG. 7.

Referring to FIG. 8, while still referring to FIG. 7, the vanes 112a-112b may engage partial circular members 132, 134. Each of the partial circular members is a partial ring with the gap in the ring facing the front edge of the base 16. In this manner, passage of the lift arm through the gap is permitted.

In the illustrated embodiment, the upper partial circular member 132 is pivotally mounted to the handle 14, such as to a horizontal rod 136 extending between the vertical bars 18 of the handle 14. This may facilitate disassembly of the adjustment assembly for cleaning.

The lower partial circular member 134 rests on the top plate 54 and may be positioned outside of the outer perimeter of the pad 56. The upper partial circular member 132 may include apertures 138 and the lower partial circular member 134 may include apertures 140. The apertures 140 may be positioned aligned with one another and with the apertures 130 in the plate 54 such that the first rod 114 of each vane 112a-112c inserts within one of the apertures 130, one of the apertures 138, and one of the apertures 140 when positioned substantially parallel to the vertical direction 12b.

As is apparent in FIG. 8, the apertures 140 are slots such that the first rod 114 is permitted to both slide and rotate within the slots. In some embodiments, the apertures 140 is omitted and the inner diameter of the lower partial circular member 134 is made sufficiently large that it does not interfere with insertion of the first rods 114 into the apertures 130. In contrast, the apertures 138 in the upper partial circular member 132 may permit rotation but not significant (e.g., larger than 2 mm) of translational movement.

The lower partial circular member 134 may further define apertures 142 that receive the second rods 116 of the vanes 112a-112c. In the illustrated embodiment, the apertures 142 are notches that extend partially radially inwardly across the radial extent of the lower partial circular member 134, e.g. inwardly from an outer circumference of the lower partial circular member 134 partially across the lower partial circular member 134 toward a center of curvature defined by the lower partial circular member.

The apertures 142 permit rotation of the second rods 116 but do not permit significant translational movement. In this manner, when the lower partial circular member 134 is rotated, all of the second rods 116 rotate with it about the first rods 116 in the apertures 130 thereby resulting in simultaneous movement of the vanes 112a-112c subject to flexing and any non-significant translational movement relative to the lower partial circular member 134 coupling the vanes 112a-112c to one another.

In some embodiments, the upper partial circular member 132 may define two notches 144 (only one being visible in FIGS. 7 and 8) protruding partially radially outwardly from the inner diameter of the member 132 and partially across the radial extent of the member 132. The notches 144 are positioned to receive the protruding ends of the third rods 118 when the vanes 112a-112b are pivoted such that two of the third rods 118 contact the member 132. In this manner, the size of dishes that may be positioned among the vanes 112a-112c is slightly increased. Note that the third rod 118 of vane 112c may extend into the gap in the upper partial circular member 132 such that a third notch 144 is not needed to achieve this benefit.

FIG. 7 further shows a drip pan 146. The drip pan 146 may mount to the base, such as below the lower plate 66 in order to catch material that drips down through the plates 54, 66. The drip pan 146 may mount to the lower plate 66 by means of rails supporting edges of the drip pan 146, clips, or other removable fastening means.

FIGS. 9A to 9C illustrate the process of adjusting the adjustment assembly 110. In the illustrated embodiment, the lower partial circular member 134 includes a plurality of edge notches 148. In the illustrated embodiment, the notches 148 are formed on the top and outer edge of the lower partial circular member 134 and include two sets of notches 148.

The notches 148 may engage one or more lock arms 150 that are pivotally mounted to the base 16, such as to the lower plate 54, frame member 22c, or other component of the base 16. The lock arms 150 may be spring loaded such that they are biased into engagement with the notches 148. A step arm 152 may be secured to the lock arms 150 such that pressing downwardly on the step arm 152 will result in the lock arms 150 pivoting out of engagement with the notches 148.

In use, a user presses (e.g., steps) on the step arm 152 to disengage the lock arms 150 with the vanes 112a-112c in a first orientation as shown in FIG. 9A. The user then rotates the vanes 112a-112c to a different orientation as shown in FIG. 9B. The user then releases the step arm 152, which permits the lock arms 150 to engage with a different pair of notches 148 corresponding to the current position of the vanes 112a-112c as shown in FIG. 9C. In the illustrated embodiment, each set of notches 148—includes three notches 148 such that the vanes 112a-112c may be locked in three different positions.

Figure 10A:
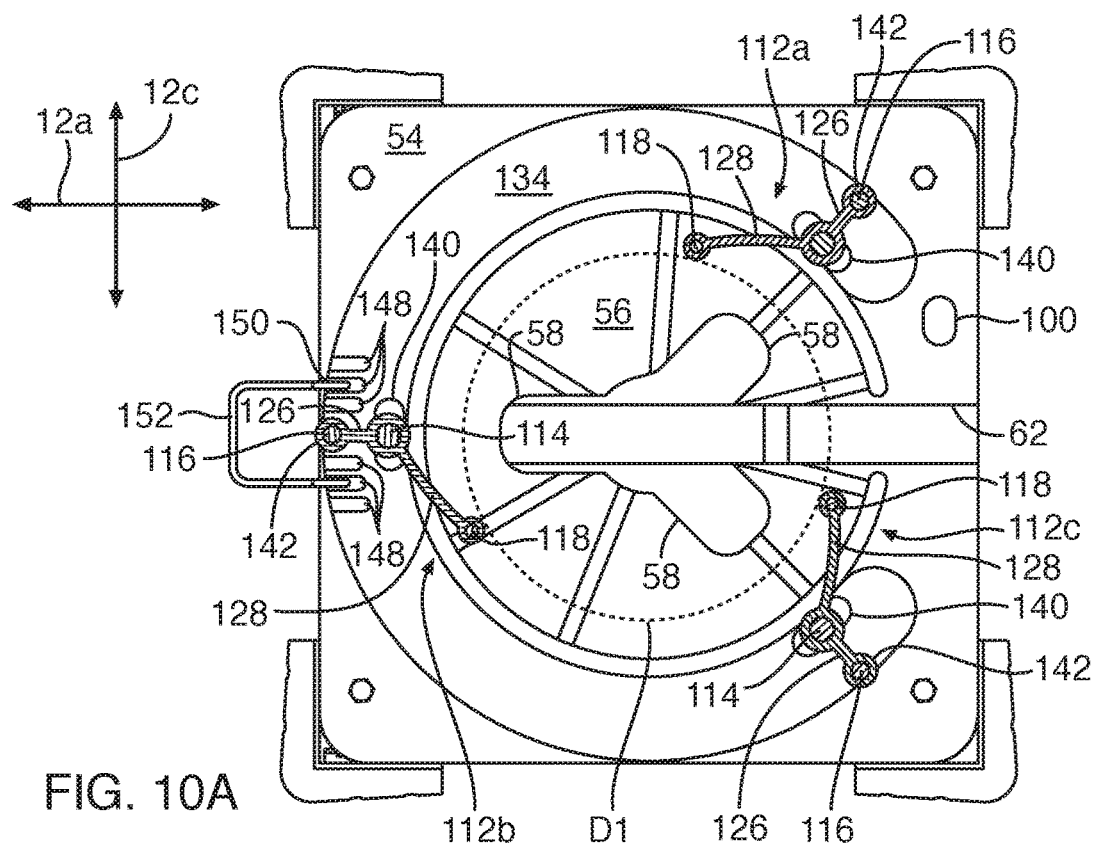
FIGS. 10A and 10B are cross-sectional views of the dish cart of FIG. 7.
Figure 10B:
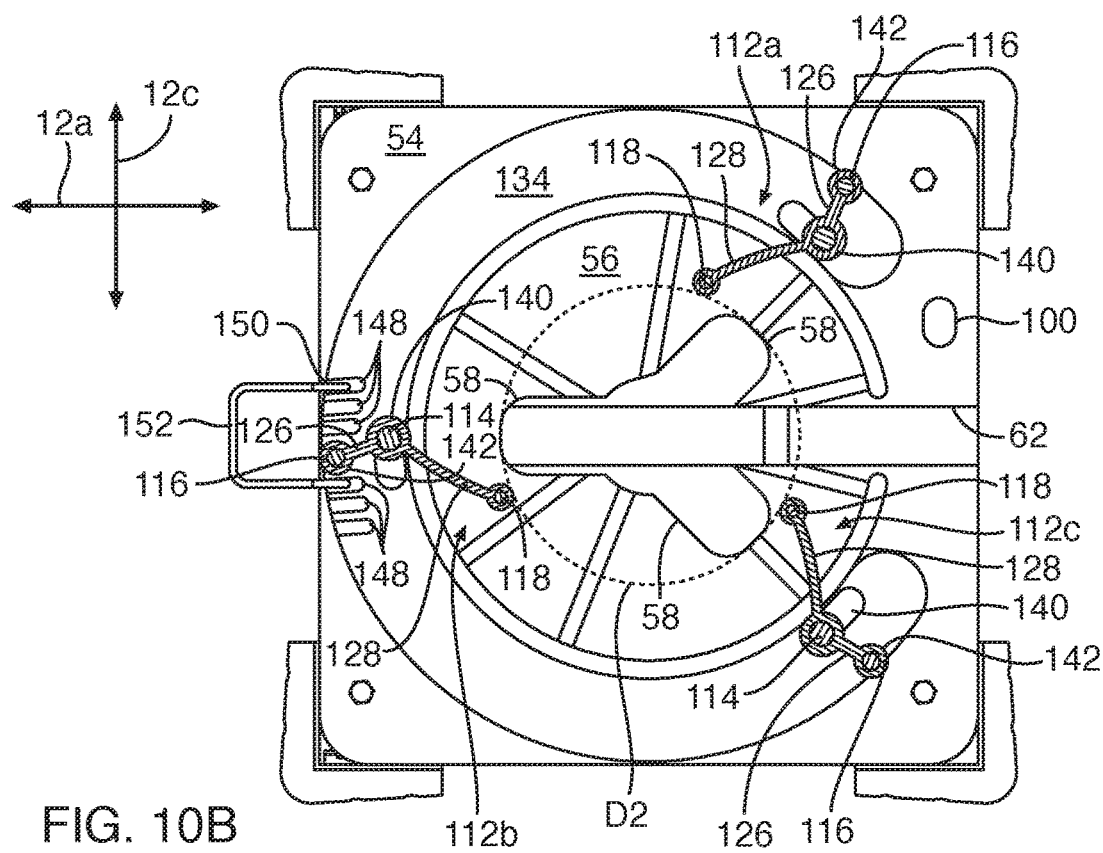

FIGS. 10A and 10B provide further illustration of the adjustment of the vanes 112a-112c. FIG. 10A illustrates the locking arms 150 in a first pair of notches 148 and the third rods 118 positioned as shown such that a first diameter D1 of dishes will fit among the vanes 112a-112c. FIG. 10B illustrates the locking arms 150 in a second set of notches 148 due to rotation of the lower partial circular member 134 and the third rods 118 positioned further inward as a result of the adjustment such that only dishes smaller than a second diameter D2, that is smaller than the first diameter D1, will fit among the vanes 112a-112c.

In particular, the innermost points of the vanes 112a-112c may be substantially equidistant (e.g., equidistance being within 2 cm from being equal distances) from a first point, e.g. a center of the plate 56 due to their coupling by the partial circular members 132, 134. This equal distance may then be varied by rotating the vanes 112a-112c using the lower partial circular member 134. Note further that in some embodiments, the vanes 112a-112c are limited such that they cannot obstruct the first point, e.g., the center of the plate 56. This may be achieved by sizing of the openings 140 that limit how much the lower partial circular member 134 may rotate. In some embodiments, the vanes 112a-112c are limited such that they cannot obstruct movement of the lift arm and lift paddle along the length of the vanes 112a-112c.

Figure 11A:
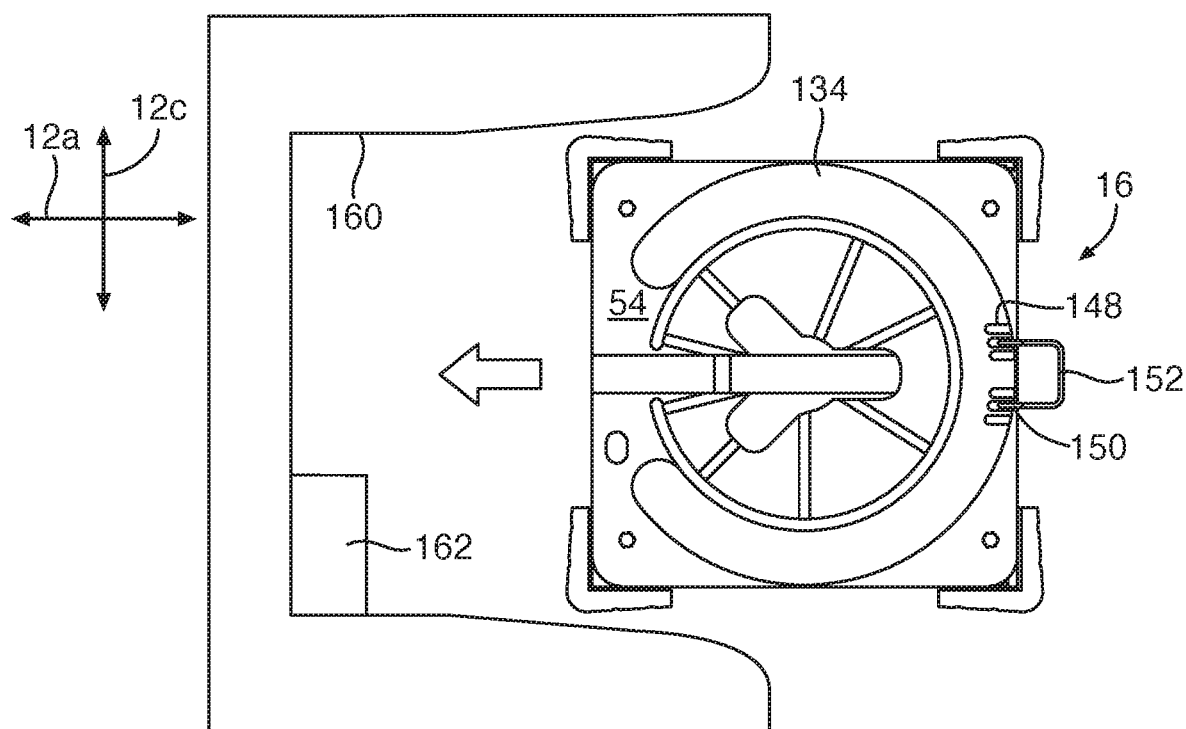
FIGS. 11A and 11B are top views showing an example usage of the dish cart of FIG. 7.
Figure 11B:
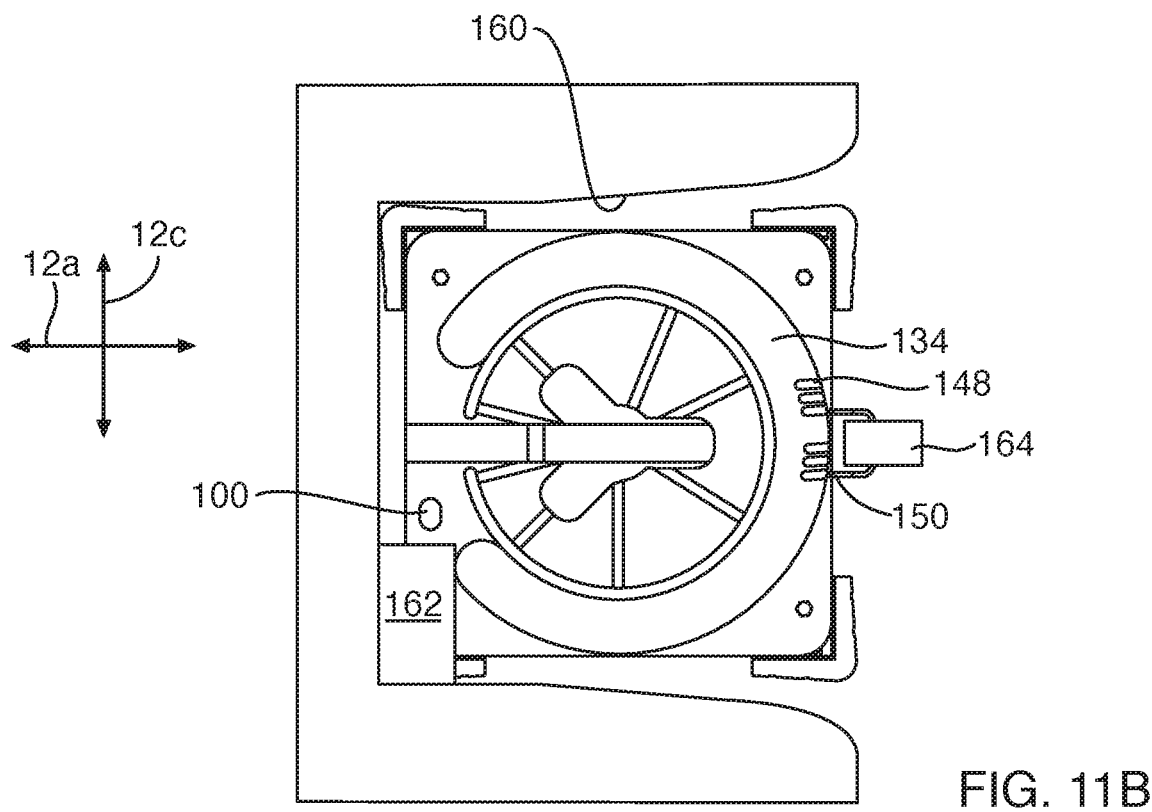
Figure 12A:
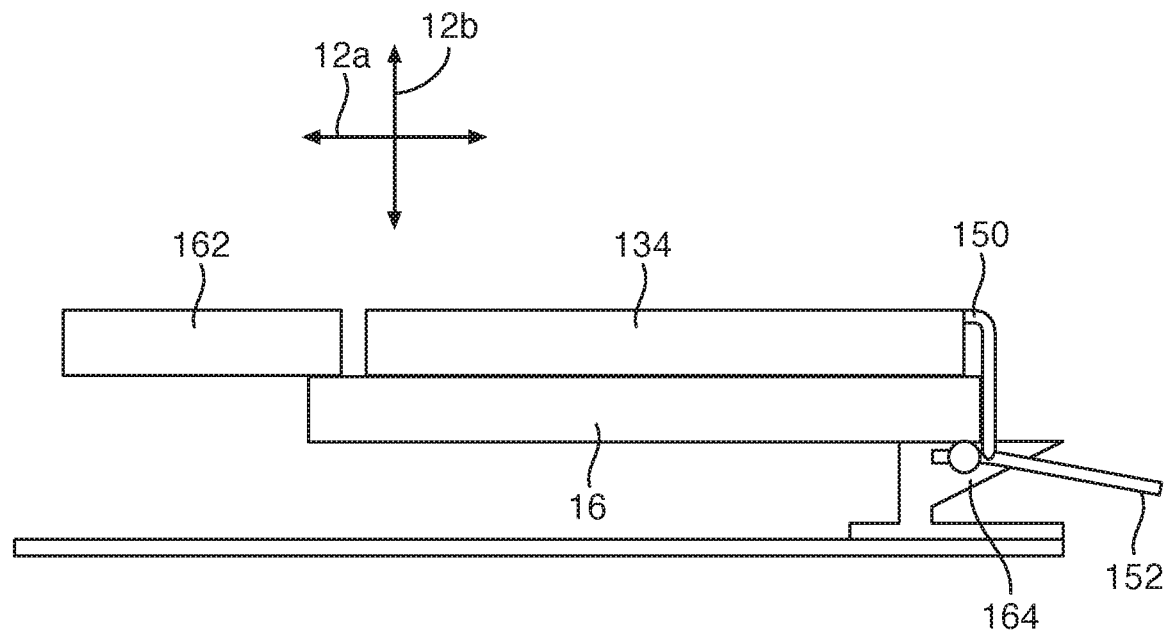
FIGS. 12A and 12B are side views showing the example usage of the dish cart of FIG. 7.
Figure 12B:
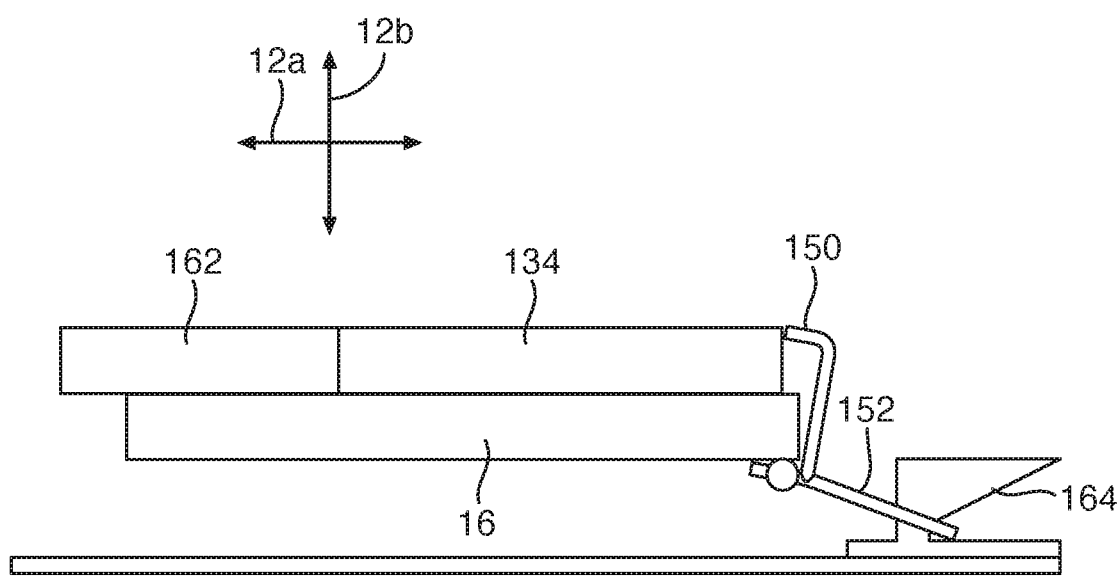

FIGS. 11A and 11B and corresponding FIGS. 12A and 12B illustrate an example use of the adjustment assembly 110. In the illustrated embodiment, an interior 160 of a dish drop, such as a dish drop described according to the embodiments below, includes a block 162, flange, or other structure that is positioned to engage the lower partial circular member 134. A hook 164 or other structure is positioned to urge the step arm 152 downward when the base 16 is urged into the interior 160.

In particular, as shown in FIGS. 11A and 12A, the base 16 may be urged into the interior 160. The block 162 then contacts the lower partial circular member 134 as the hook 164 engages the step arm 164 and urges it downwardly, disengaging the lock arms 150 from the notches 148 and permitting the block 162 to rotate the lower partial circular member 134, as shown in FIGS. 11B and 12B. The block 162 then maintains the lower partial circular member 134 in this orientation. Removal of the base 16 from the interior 16 may be resisted by a cart lock engaging the aperture 100, such as a cart lock according to any of the embodiments described below with respect to FIGS. 24-28C.

FIGS. 11A-12B illustrate just one example of how the adjustment assembly 110 may be adjusted. In other embodiments, a knob or handle is secured to one of the rods 114, 116, 118 of one of the vanes and can be rotated by a user to adjust the adjustment assembly 110. The knob may be removable to permit disassembly. For example, the knob may removably secure to a portion of a rod 114, 116, 118 protruding above the upper partial circular member 132. In some embodiments, there is one and only one knob secured to one of the rods 114, 116, 118.

Figure 13:
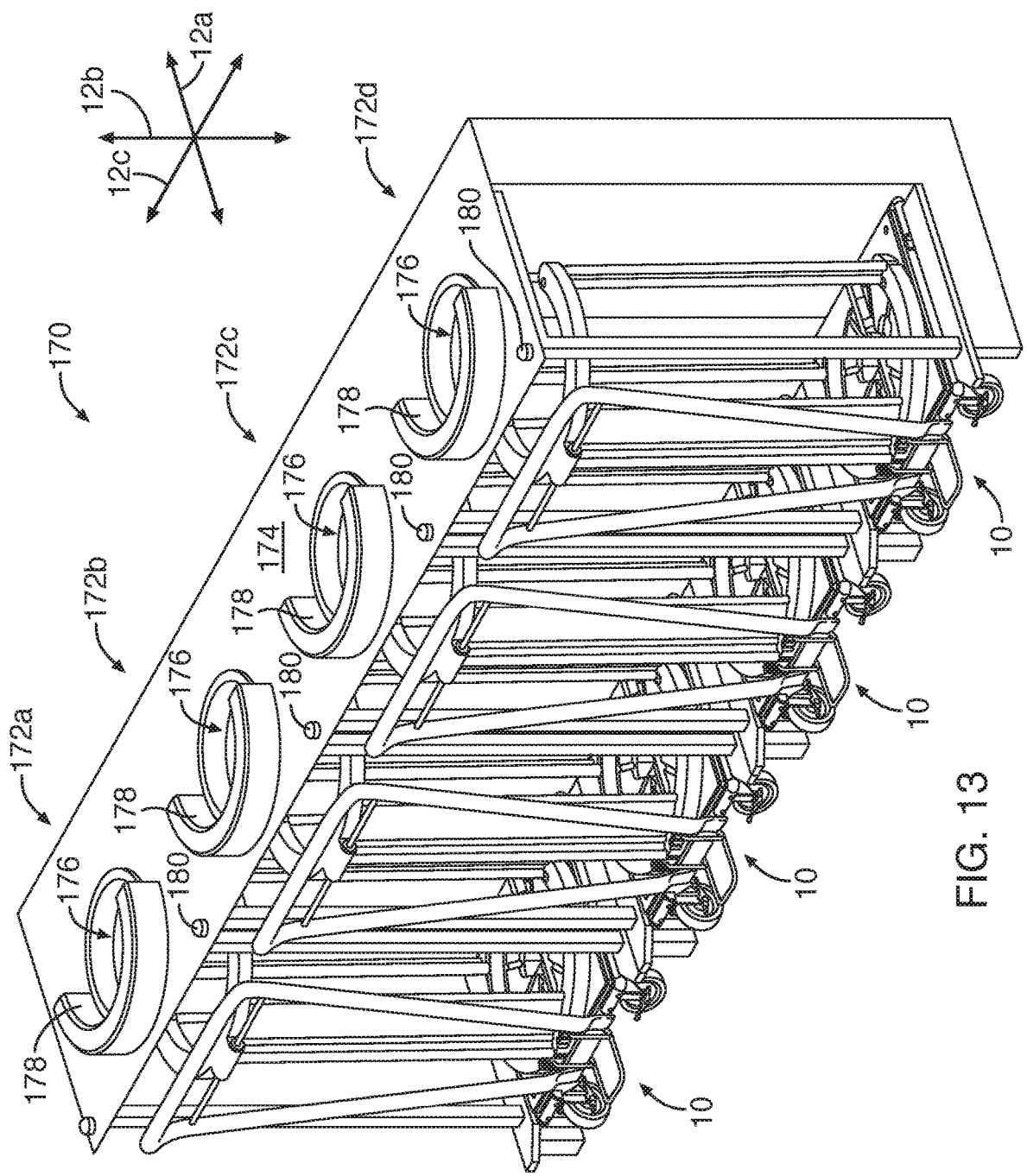
FIG. 13 is an isometric view of a set of dish drop stations with corresponding dish carts in accordance with an embodiment of the present invention.

Referring to FIG. 13, a dish drop 170 may include one or more dish drop stations 172a-172d that are each sized and configured to receive a cart 10 according to any of the foregoing embodiments. In the illustrated configuration, the dish carts 10 are according to the embodiment of FIGS. 7 through 10B.

The dish drop 170 may include a single top wall 174 for all of the stations 172a-172d or separate top walls 174 for each station 172a-172d. The top wall 714 over each station 172a-172d includes an opening 176 for receiving dishes that stack within dish carts 10 positioned within the stations 172a-172d. In some embodiments, each station 172a-172d includes a collar 178 that protrudes upwardly from the top wall 174 and partially or completely surrounds the opening 176 of the station 172a-172d. The collar 178 may house electronics such as an antenna for transmitting a state of the station 172a-172d, sensors for detecting a height of items stacked in the station 172a-172d, or other components. Accordingly, the collar 178 may be formed of plastic or other polymer that permits transmitted signals to pass therethrough.

In the illustrated embodiment, each station 172a-172d includes a button 180 placed on the top wall 174 for each station 172a-172d or positioned elsewhere, such as an inner wall 192 (facing away from the viewer in FIG. 13). The button 180 may be a mechanical button, touch screen interface, switch, or any other type of structure able to receive user interaction. As discussed below, the button 180 may instruct a controller to lower a lift arm and lift paddle to an unlock position such that cart 10 at the station 172a-172d may be removed.

Figure 14:
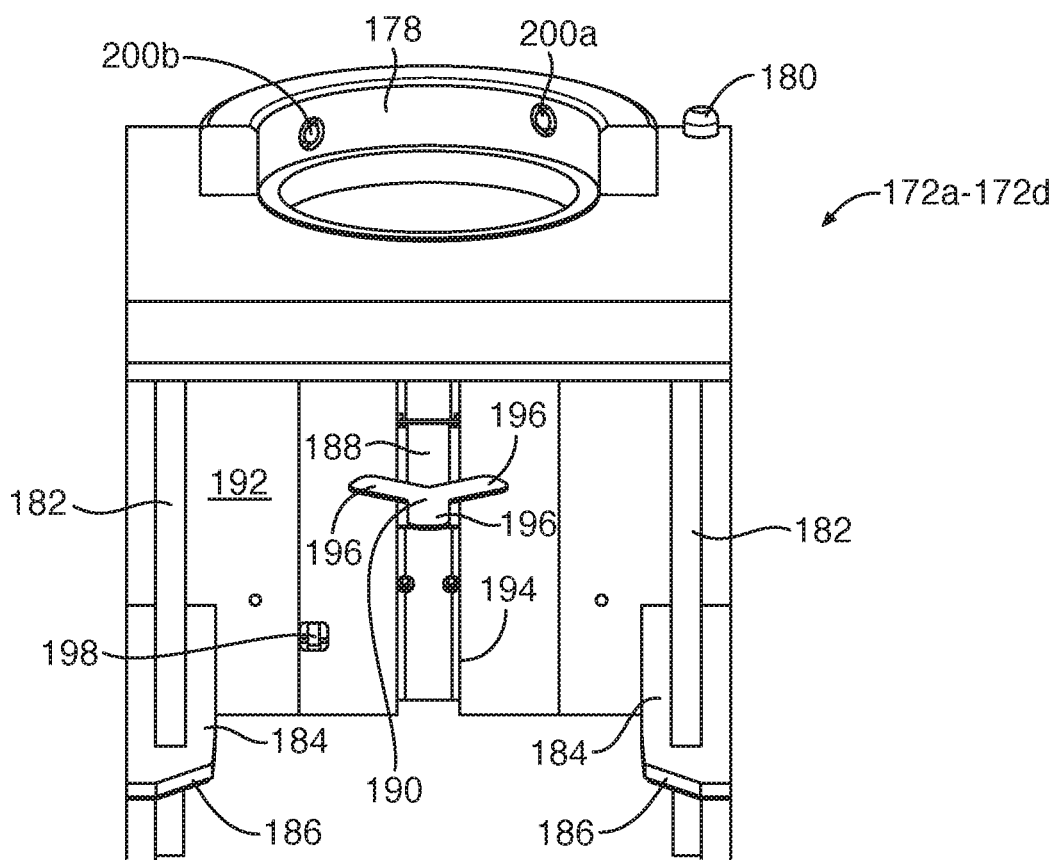
FIG. 14 is a front isometric view of the dish drop station of FIG. 13.
Figure 15:
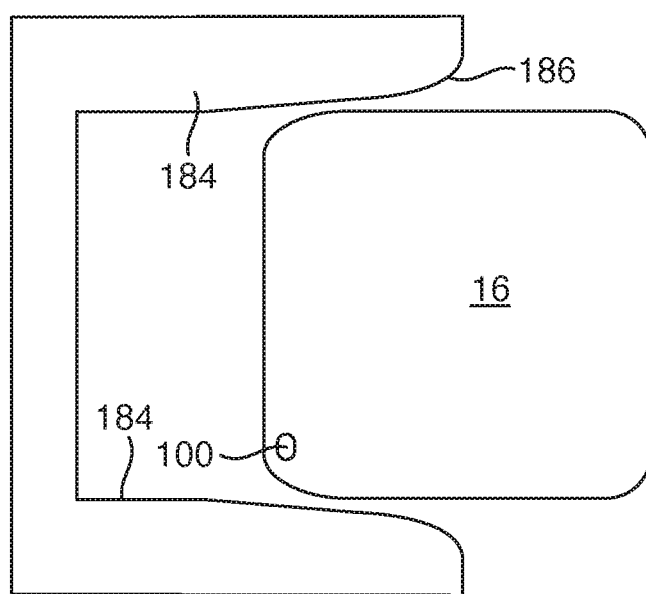
FIG. 15 is a schematic diagram illustrating usage of a dish drop station in accordance with an embodiment of the present invention.

FIG. 14 illustrates an individual dish drop station 172a-172d. As is apparent, the station 172a-172d may include side walls 182 or a side frame 182 having guides 184 mounted thereto. The guides 184 facilitate insertion of the cart 10 into the station 172a-172d. At an entrance of the dish drop station 172a-172d, the guides 184 may be flared, such as by means of a bevel 186 or chamfer that urges the cart 10 into alignment with the guides 184 in cases where it is slightly misaligned as shown in FIG. 15.

FIG. 14 further shows the lift arm 188 and lift paddle 190 that operate in conjunction with features of the cart 10 intended for cooperation with the lift arm 188 and lift paddle 190 as described above. The lift arm 188 protrudes from an inner wall 192 of the station 172a-172d and moves along the inner wall 192 substantially parallel the vertical direction 12b. The inner wall 192 may define a slit 194 substantially parallel to the vertical direction 12b along which the arm 188 moves and through which the arm 188 protrudes. The edges of the slit 194 may be lined with a flexible material such that the flexible material substantially completely (e.g., 90 percent) covers the slit 194 but deforms to permit movement of the arm 188 as it passes along the flexible material.

In the illustrated embodiment, the lift paddle 190 has three lobes 196. However, a lift paddle 190 with four lobes may be used with a cart 10 configured to cooperate therewith as described above.

FIG. 14 further illustrates a cart lock 198 that may engage the aperture 100 in the plate 54 of a dish cart 10 according to the embodiments disclosed above. As noted above, there may be two apertures 100 in some embodiments of the dish cart 10. Accordingly, some embodiments of the stations 172a-172d may further include two cart locks 198. Functioning of the cart locks 198 and different embodiments thereof are described in greater detail below.

In the illustrated embodiment, the collar 178 includes stack height sensors 200a, 200b. In other embodiments, these sensors 200a, 200b may be incorporated into the opening 176. The stack height sensors 200a, 200b may be offset from one another in the vertical direction 12b. For example, stack height sensor 200a may be an upper height sensor and sensor 200b may be a lower height sensor that is positioned slightly below sensor 200a in the vertical direction 12b (e.g., on the order of 3 to 15 mm or 0.5 to 2 times a thickness of a dish stacked using the station 172a-172b).

In operation, a controller drives an actuator coupled to the lift arm 188 according to outputs of the sensors 200a, 200b. For example:

(A) If sensor 200b is obstructed and sensor 200a is not, do nothing;
(B) If both sensors 200a, 200b are obstructed, lower the lift arm 188 until sensor 200a is not obstructed but sensor 200b is obstructed; and
(C) If both sensors 200a, 200b are not obstructed, raise the lift arm 188 until sensor 200a is not obstructed but sensor 200b is obstructed.

Case (B) occurs when items are being added to a dish cart 10 at the station 172a-172d, which may occur when collecting dirty dishes or loading a dish cart 10 with clean dishes. For example, a dish drop station 172a-172d may be placed next to a dish washing machine for loading of clean dishes from the dish washing machine into carts 10.

Case (C) occurs when items are being removed from a dish cart 10 at the station, which may occur when removing dirty dishes for cleaning or when removing clean dishes for serving food on them. For example, a dish drop station 172a-172d may be placed next to a conveyor belt such that a worker may remove dishes from the dish drop station 172a-172d and place them on the conveyor belt for subsequent processing such as rinsing and loading into dish racks.

In another example, the cart 10 may be substituted with a rack cart 80. Accordingly, a rack cart station may have the structures of a dish drop station 172a-172d sized to receive dish racks and the top plate 174 and collar 178 may be omitted such that racks may be placed on a rack cart. However, stack height sensors 200a, 200b may be retained, such as mounted to the side walls 182 or inner wall 194. Accordingly, in case C, racks may be removed from the rack cart station for filling with dishes while the lift arm 188 is raised such that the lower stack height sensor 200b becomes obstructed and the upper stack height sensor 200a becomes/stays unobstructed. For example, a rack cart station and a dish drop station 172a-172d may be used simultaneously according to case C: dishes are removed from the dish drop station 172a-172d, rinsed, and loaded into dish racks. As dish racks are filled, new dish racks are retrieved from the rack cart station. Loaded dish racks may then be loaded into a dish washer. Loaded dish racks may be placed on a conveyor belt feeding through the dish washer.

The sensors 200a, 200b may be embodied as break beam sensors, optical (e.g., camera) sensors, or any other sensor for detecting presence or absence of an item within a region around the sensor. The sensors 200a, 200b may further be embodied as distance sensors that can sense a distance to a dish positioned in front of the sensors 200a, 200b. In this manner, the sensors 200a, 200b can detect both whether an object is detecting it but also whether it is in fact a dish. For example, an appropriately sized dish would have an edge closer to the sensor 200a than another object, such as flatware or other object. A controller may therefore detect non-dishes or dishes that are too small and rejection them, e.g. refuse to lower the list arm 188 when a non-dish or a dish that is too small as determined according to the output of the distance sensors 200a-200b is detected.

Figure 16:
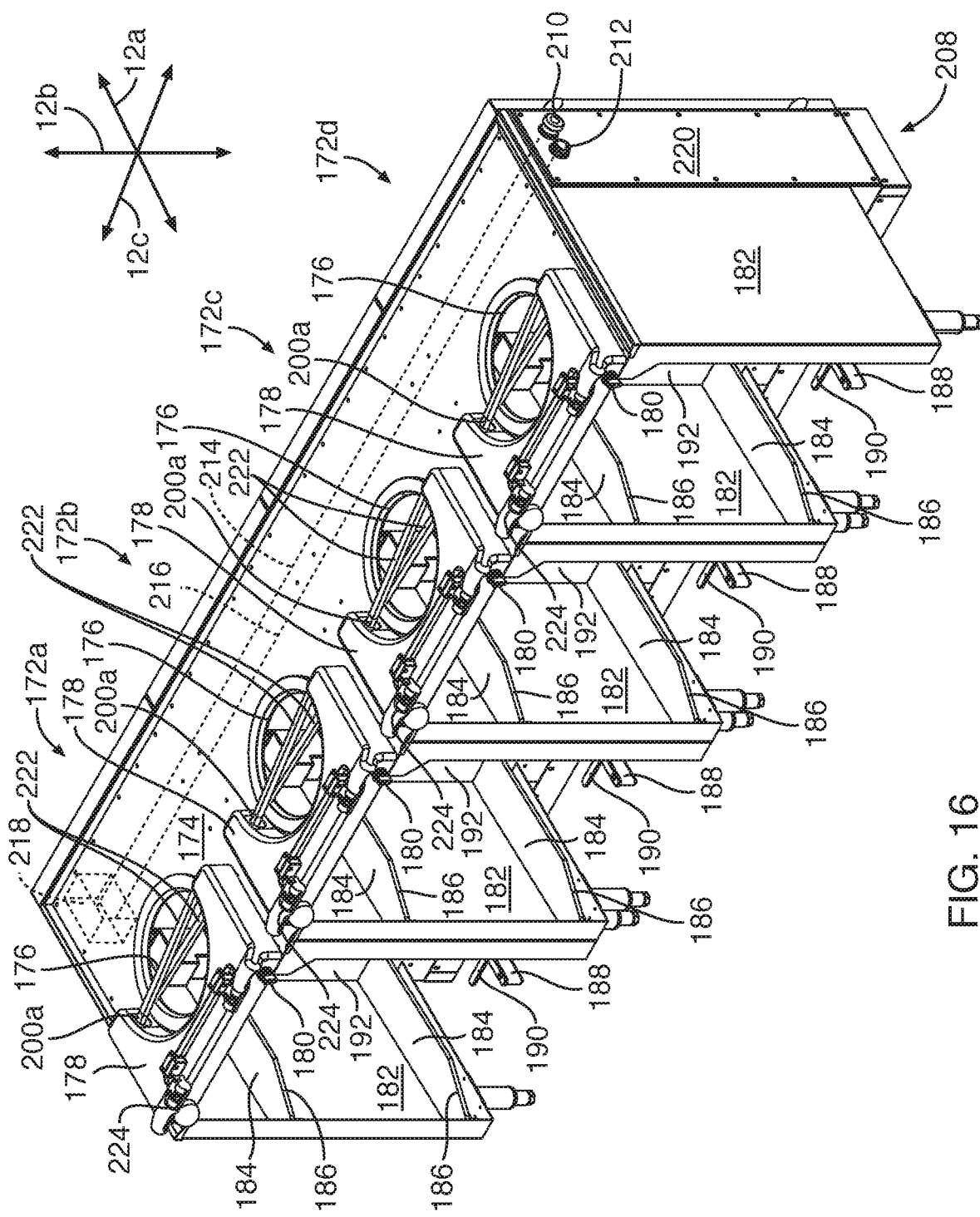
FIG. 16 is an isometric view of a set dish drop stations according to an alternative embodiment of the present invention.

FIG. 16 illustrates alternative embodiments for some of the features of a dish drop 170. In the illustrated embodiment, the sidewalls 182 of each dish drop station 172a-172d include two pairs of guides 184 that are offset from one another along the vertical direction to facilitate insertion of carts into the dish drop stations 172a-172d. The lift paddle 190 may have the four-lobe design as discussed above. However, the three-lobe design may also be used.

The dish drop stations 172a-172d may each include a front housing 208 positioned in front of the inner wall 192, such that the inner wall 192 is positioned between the side walls 182 and the front housing 208. The front housing 208 may house a drive motor for driving the lift arm 188 and electronic circuits forming the controller for controlling operation of the dish drop station 172a-172d. The front housing 208, and possibly the sidewalls 182, of adjacent dish drop stations 172a-172d may be fastened, e.g. bolted, to one another. Sealant or seals may be placed between the front housings 208 of adjacent dish drop stations 172a-172d to prevent entry of contaminants into the front housings 208.

In some embodiments, an emergency stop button 210 is mounted to a side of the front housing 208 of one of the drop stations 172a-172d, e.g. one of the drop stations on the ends of the series of drop stations 172a-172d, the rightmost dish drop station 172d in the illustrated embodiment. A restart button 212 may also be mounted to the side of the front housing 208 of one of the drop stations 172a, 172d on the ends. The restart button 212 may be coupled to the controller and, when pressed, may instruct the controller to restart operation of the drop stations 172a-172d following pressing of the emergency stop button 210. In the illustrated example, this is the same station 172d to which the emergency stop button 210 is mounted.

One or more wires 214 may couple the emergency stop button 210 to the controllers of the dish drop stations 172a-172d for invoking an emergency stop of all of the dish drop stations 172a-172d. Likewise, one or more wires 216 may couple the reset button 212 to the controllers of the dish drop stations 172a-172d for invoking resetting the dish drop stations 172a-172d following pushing of the emergency stop button 210.

In the illustrated embodiment, one of the dish drop stations 172a-172d includes a power supply 218 that may be embodied as an adaptor or other interface to an electrical outlet. The power supply 218 may also be a rechargeable battery. In the illustrated embodiment, the power supply 218 is positioned in the dish drop station 172a that is on an opposite end of the series of dish drop stations 172a-172d from the dish drop station 172d to which the emergency stop button 210 and the power button 212 are mounted.

The lines 214, 216 may therefore include lines coupling power to the dish drop stations 172a-172d from the power supply 218 and lines coupling control signals to the dish drop stations 172a-172d from the buttons 210, 212.

In the illustrated embodiment, each side of the rear housing (left and right in the illustrated example, i.e., substantially parallel to the vertical and longitudinal directions 12a, 12b) includes an opening. The openings on the exposed sides of the housing 208 of the dish drop stations 172a and 172d on the ends are closed by a cover 220 secured over the opening. The emergency stop button 210 and power button 212 may be mounted on this cover 220. The cover 220 on the left side of dish drop station 172a is present but not visible in the illustrated example. The cover 220 on the left side may be identical but may lack the emergency stop button 210 and power button 212. For example, an electrical plug for interfacing with the power supply 218 may be accessible through the cover 220 on the dish drop station 172a, such as by means of an electrical cord protruding through the cover 220 and coupled to the power supply 218.

The intermediate dish drop stations 172b-172c that are not on the ends may lack covers 220. Likewise, inner facing surfaces of the end drop stations 172a, 172d may lack covers 220 (the left side of station 172d and the right side of station 172a in the illustrated example). This may facilitate routing of the lines 214, 216 through the stations 172a-172d.

Accordingly, the stations 172a-172d may provide conduits or passages through the front housing 208 to facilitate this routing.

The embodiment of FIG. 16 illustrates an alternative embodiment for the collar 178 that includes a rectangular shape with a semicircular cutout around the openings 176. The collar 178 near its rear edge defines a pivot 224 or hinge 224 to which a lid may attach and rotate about an axis substantially parallel to the horizontal direction 12c. A motor may be incorporated into the collar 178 for automatically opening and closing the lid. A sensor may be incorporated into the collar 178 for sensing the position of the lid as positioned by a human operator, e.g. opening and closing of the list. For example, upon closing, the controller may receive an output from the position sensor indicating closing and, in response, invoke lowering of the lift arm 188 to the unlock position. Upon opening, the controller may receive an output from the position sensor indicating opening and, in response, invoke raising of the lift arm 188 until the lower stack height sensor 200b is obstructed and the upper stack height sensor 200b is not obstructed.

The embodiment of FIG. 16 further illustrates beams 222 emitted by the sensors 200a, 200b. As shown the beams 222 overlap the opening 176 of the dish station 172a-172d in a plane parallel to the longitudinal and horizontal directions 12a, 12c. The beams 222 of the sensors 200a, 200b are offset from one another in the vertical direction 12b such that each sensor 200a, 200b senses obstruction at a different vertical position. As known in the art, a break beam sensor includes a transmitter that emits the beam 222 directed at a receiver that receives the beam 222 when there is no obstruction. Obstruction is therefore detected when the receiver produces an output indicating that the beam is no longer detected. Accordingly, where the sensors 200a, 200b are embodied as break beam sensors, the transmitter and receiver for each sensor 200a, 200b may be mounted within the collar 178 such that the transmitter and receiver for the upper stack height sensor 200a are at a higher vertical position along vertical direction 12b than the transmitter and receiver for the lower stack height sensor 200b. As noted above, the sensors 200a, 200b may be distance sensors. The sensors 200a, 200b may therefore be used to estimate a diameter of a dish positioned adjacent the sensor 200a, 200b.

FIGS. 17 and 18 illustrate a dish drop stations 172a-172d having a lid 230 rotatably mounted to the pivot 224. The pivot 224 may be a dampened hinge in order to reduce damage to the lid and avoid sudden closing and opening. As shown, the lid 230 may hang over the rear side of the station 172a-172d when open. The lid 230 may define openings 232 to facilitate gripping and lifting by a user. In the illustrated embodiment, the distal end and lateral edges of the lid 230 may have sides 234a-234c extending downwardly therefrom and resting on the top plate 174 when the lid is closed. In such embodiments, the openings 232 may be defined in one or more of the sides 234a-24c, such as in the sides 234a and 234c in the illustrated embodiment. Various other embodiments of a lid 230 may be used. For example, the lid may be slidably attached to the collar 178 or top plate 174.

The lid 230 may define an indentation 236 for receiving additional dinner ware stacked on it when it is closed, e.g. a circular indentation having a flat bottom sized to receive plate that will also fit through the collar 178, the indentation having a depth of between 1 and 2 cm below the portion of the lid 230 surrounding the indentation.

The controller may be coupled to a motor 238 controlling actuation of the lid 230. The controller may also be coupled to a sensor 240 that senses a state of the lid 230, e.g. whether the lid 230 is closed. A sensor 240 may be used that senses an angular position of the lid 230.

In some embodiments, the controller may be programmed to cause the motor 238 to close the lid 230 in response to the lift arm 188 reaching the full position when receiving dishes. The controller may be programmed to cause the motor 238 to close the lid 230 in response to the lift arm 188 reaching the top position when dispensing dishes. The controller may be programmed to refrain from lifting the lift arm 188 in response to detecting that the lid sensor 346 indicates that the lid is closed. The controller may be programmed to generate an alert if the lid sensor 240 does not indicate that the lid has closed after the controller has invoked closing of the lid 230 by the motor 238. In some embodiments, the controller may be programmed to lower the lift arm 188 to the home position or the unlock position in response to sensing that the lid 230 has been closed according to the lid sensor 240.

Figure 19:
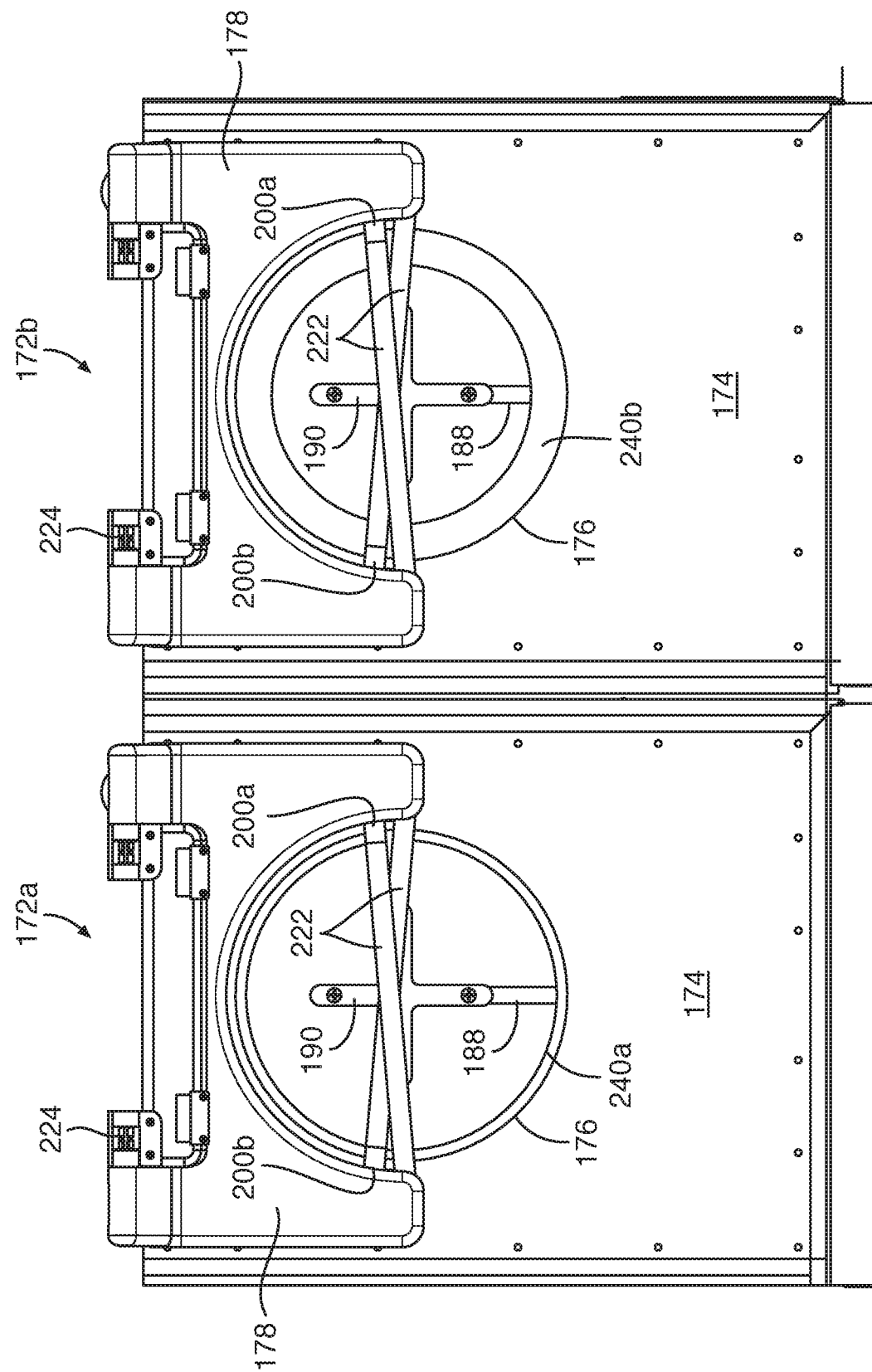
FIG. 19 is a top view of the dish drop station of FIG. 18.

Referring to FIG. 19, in many cases, a restaurant will use dishes of various sizes at the same time. Dish carts 10 may be configured to accommodate these different sizes. The dish drop stations 172a-172d may likewise be configured to accommodate differently sized dishes. FIG. 19 illustrates a dish drop station 172a with a ring 240a positioned within the opening 176, the ring 240a having a first inner diameter. A dish drop station, 172b in this example, includes a differently sized ring 240a positioned in its opening 176, the ring 240b having a second inner diameter that is less than the first inner diameter. In this manner, users are prevented from putting dishes in the station 172b that are too large. The rings 240b may rest in the openings 176, e.g., by defining flanges that rest on the top plate 174 and prevent the rings 240a, 240b from passing completely through the openings 176.

The rings 240a, 240b may be used in conjunction with the block 162 of FIGS. 11A to 12B. In particular, a ring 240a, 240b and block 162 of a dish drop station 172a-172d may be selected that correspond to one another such that the block 162 adjusts the adjustment assembly 110 of carts 10 positioned in the dish drop station 172a-172d such that the vans 112a-112c are positioned to receive dishes sized to fit through the selected ring 240a, 240b and are not positioned to receive dishes (i.e., define an unobstructed space among the vanes 112a-112c that is too small to receive dishes) that are too large to fit through the selected ring 240a, 240b.

The rings 240a, 240b may also be used in cooperation with dish carts 10 incorporating rails 48 sized to receive dishes passing through a ring 240a, 240b matching the dish diameter that will fit among the rails 48 as described below with respect to FIGS. 2 and 5.

FIG. 19 further illustrates the configuration of the sensors 200a, 200b. In particular, each break beam sensor 200a, 200b includes both a transmitter and a receiver that are co-located and mounted in the collar 178 over the opening 176. Light 222 from the transmitter of a sensor 200a, 200b that is reflected back to the receiver of the sensor 200a, 200b indicates obstruction and may further be used to measure a distance to the object that reflected the light.

Figure 20:
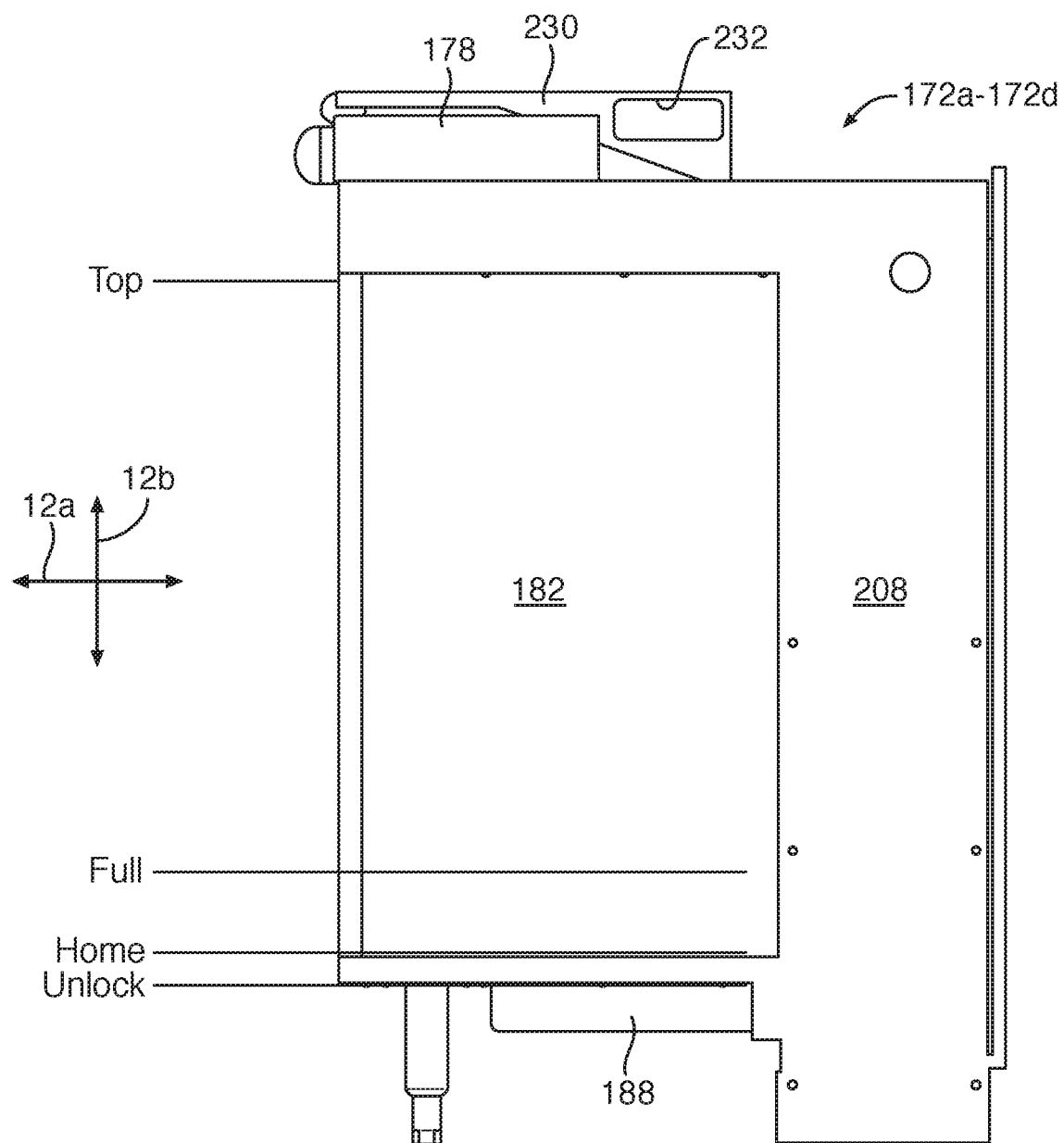
FIG. 20 is a side view of a dish drop station showing various positions of a lift arm in accordance with an embodiment of the present invention.

Referring to FIG. 20, in use the lift arm 188 may operate among predefined positions as controlled by the controller of the dish drop station 172a-172d. In particular, the arm may begin at a home position ("Home" in FIG. 20) in which the lift arm 188 and lift paddle 190 are positioned below the top plate 54 of a cart 10 positioned in the dish drop station 172a-172d. Specifically, in the home position the lift arm 188 and paddle 190 are positioned in a gap below the top plate 54 and above any front frame member 22a or bottom plate 66. In this manner, in the home position, the cart 10 may be inserted into the dish drop station 172a-172d without the lift arm 188 and lift paddle 190 interfering with the insertion. Likewise, in the home position, any dishes loaded onto the lift paddle 190 will be deposited on the pad 56 and will likewise not interfere with insertion of the lift arm 188 and lift paddle 190. As discussed below with respect to FIGS. 24 through 28C, in the home position, a cart will be able to latch itself into the dish drop station 172a-172d without requiring movement of the lift arm 188.

The controller may further position the lift arm 188 in an unlock position ("Unlock" in FIG. 20). The unlock position is slightly (e.g., 1-3 cm) below the home position and results in the lift arm 188 engaging the cart lock 198 such that the cart lock 198 disengages from the dish cart 10. Example cart locks 198 are described below.

In some embodiments, a controller will permit automated lowering of the lift arm 188 and lift paddle 190 according to outputs of the sensors 200a, 200b until the lift arm reaches a full position ("Full" in FIG. 20). Upon sensing movement of the lift arm 188 to this position, the controller will stop lowering the lift arm 188 in response to obstruction of the upper stack height sensor 200a. For example, the controller may move the lift arm 188 to the home position or the unlock position.

The controller may likewise sense arrival of the lift arm 188 at a top position ("Top in FIG. 20). Upon sensing arrival at the top position, the controller no longer raises the lift arm 188 in response to detecting that the lower stack height sensor 200b is not obstructed.

In some embodiments, the lid 230 may be actuated by an actuator, e.g. an electric motor. Accordingly, the controller may be programmed to cause the actuator to close the lid 230 upon detecting arrival of the lift arm 188 at the top position or the full position.

Upon reaching the full position or the top position, the controller may lower the lift arm 188 to the home position and refrain from taking further action until an instruction is received. For example, the controller may be programmed to wait until an instruction is received to lower the lift arm 188 to the unlock position, such as detecting pressing of the button 180, receiving a wireless control signal, detecting closing of the lid 230, or some other control input.

Figure 21A:
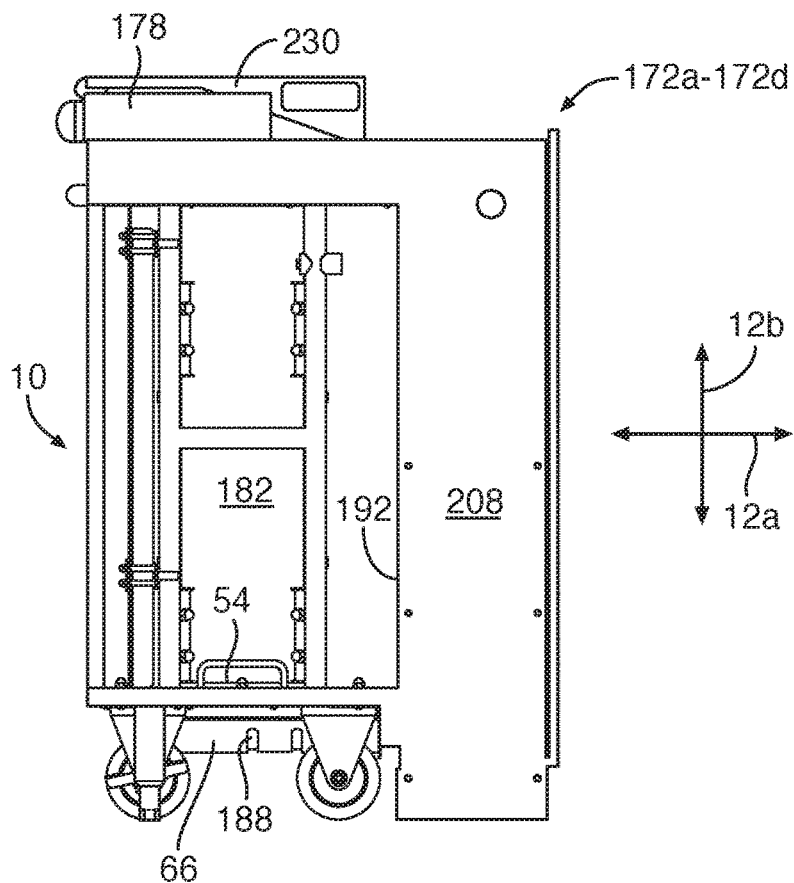
FIGS. 21A and 21B are side views of a dish drop station and dish cart showing a manner of usage thereof in accordance with an embodiment of the present invention.
Figure 21B:
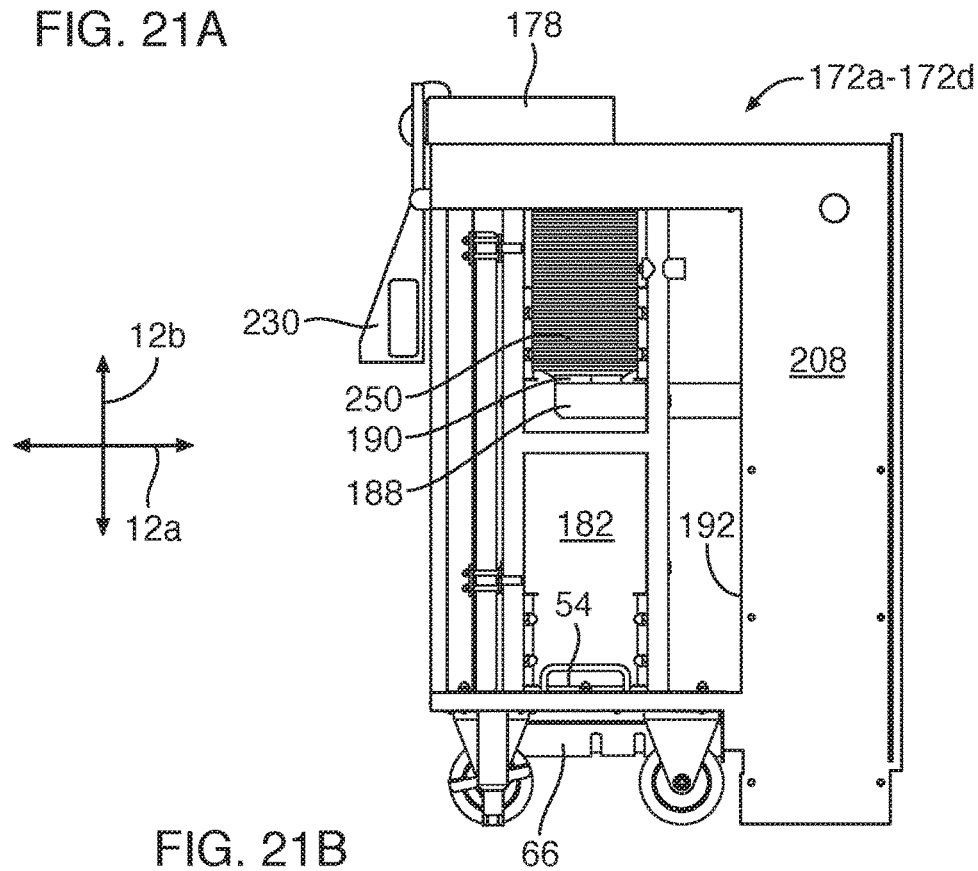

Sensing position of the lift arm 188 may be accomplished using any sensing technology known in the art, such as limit switches mounted in the dish drop station 172a-172d that are triggered by the lift arm 188 when located at the designated location (e.g., the full position and top position), break beam sensors mounted in the dish drop station 172a-172d that detect obstruction by the lift arm 188 when at the designated location. Sensing of the position of the lift arm 188 may also be performed using encoders such as hall encoders or optical encoders FIGS. 21A and 21B illustrate use of a dish drop station 172a-172d in combination with a dish cart 10. As shown in FIG. 21A, a loaded or unloaded cart (unloaded in the illustrated example) is positioned within the dish drop station 172a-172d with its front edge facing the inner wall 192 and such that the lift arm 188 inserts below the top plate 154, such as in a gap between the front frame member 22a and the lower plate 66. Positioning of the cart 10 may be accomplished by rolling the cart into the dish drop station 172a-172d along the longitudinal direction 12a. The lift arm 188 is positioned in the home position or the unlock position during insertion.

The controller may then invoke raising of the lift arm 188 and lift paddle 190 through the lobe openings 58 in the pad 56 and plate 54 and through the slots 60, 62. When the cart 10 is loaded with dishes 250, the lift arm 188 will rise until the lower stack height sensor 200b is obstructed and the upper stack height sensor 200a is not obstructed preparatory to removing dishes 250 from the cart 10 for serving food or for washing. The controller will then raise the lift arm 188 when the lower stack height sensor 200b is not obstructed until either the lower stack height sensor 200b is obstructed or the lift arm 188 reaches the top position.

When the cart 10 is empty, the lift arm 188 will rise to the top position preparatory to receiving clean or dirty dishes 250. The controller will then lower the lift arm 188 when the upper stack height sensor 200a is obstructed until the upper stack height sensor 200a is not obstructed or the lift arm 188 reaches the full position.

Referring to FIGS. 22 and 23, raising and lower of the lift arm 188 may be performed using the illustrated drive mechanism that is housed within the front housing 208. The illustrated drive mechanism is exemplary only. Any translational actuator known in the art may be used for raising and lower the lift arm 188. In a like manner, any position sensing technology known in the art may be used to sense the position of the lift arm 188 or to detect when the lift arm 188 is at a predetermined position (e.g., the top, full, and unlock positions).

In the illustrated embodiment, one or more rails 260 guide sliding of one or sliders 262 mounted to the rails 260 along the vertical direction 12b. In the illustrated embodiment, the sliders 262 clamp onto the rails 260. Alternatively, the rail 260 may be replaced with a vertically oriented slot into which slider's 262 insert.

One or both of the sliders 262 is fastened to a chain 264 looped around a lower sprocket 266a and an upper sprocket 266b. The upper or lower sprocket 266a, 266b may be driven by a motor 268 that is controlled by the controller. The cart lock 198 is mounted adjacent the rails 260 and engages the aperture 100 on a dish cart 10 in order to hinder removal of a cart until the lift arm 188 is in the unlock position. Various embodiments of the cart lock 198 are described below. The cart lock 198 may be located near the bottom of the travel of the lift arm 188, such that the cart lock 198 is unlocked when the sliders 262 are slightly above (e.g., 1-3 cm) a top of the lower sprocket 266a.

As noted above, position sensors may sense when the lift arm 188 is positioned at the top, full, or unlock positions. For example, sensors 270a, 270b, 270c, and 270d may be positioned to sense when the lift arm is at positions corresponding to the unlock, home, full, and top position, respectively as shown. The sensors 270a-270d may be mechanical buttons or switches positioned such that they actuated by sliders 262 or lift arm 188 as it travels along the rails 260. Alternatively, the sensors 270a-270d may be break beam sensors that are obstructed by the lift arm 188 or other structure (e.g. the sliders 262) coupled to the lift arm 188 as it moves to the position of the break beam sensor.

In other embodiments, the motor 268 is a stepper motor such or a DC (direct current) motor with an integrated absolute encoder such that its movement is known and may be used to infer the position of the lift arm 188 and whether it is at any of the top, full, and unlock positions. In still other embodiments, rotation of a sprocket 266a, 266b or the motor 268 itself is measured and used to infer the position of the lift arm 188 and whether it is at any of the top, full, unlock, and home positions.

Figure 24:
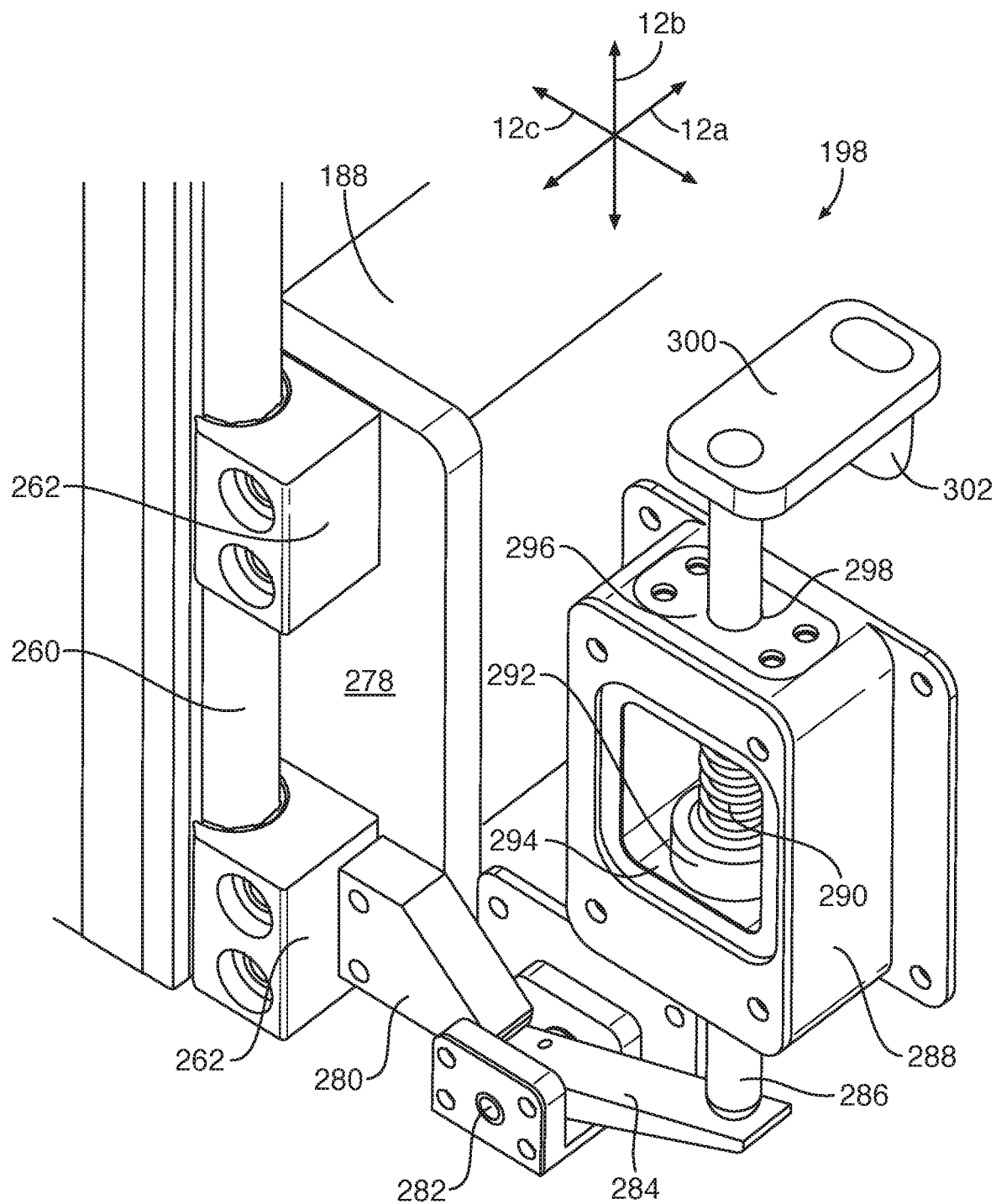
FIG. 24 is an isometric view of a cart lock mechanism of a dish drop station in accordance with an embodiment of the present invention.

Referring to FIG. 24, some embodiments the sliders 262 include four sliders, two on each rail 260. The sliders 262 may fasten to a plate 278 to which the lift arm 188 is fastened, such as by means of welds, bolts, or other fastening means.

FIG. 24 further illustrates an example embodiment of a cart lock 198. The cart lock 198 may interface with a pressing tab 280 that is coupled to the lift arm 188, i.e. moves vertically in unison with the lift arm 188. In the illustrated embodiment, the pressing tab 280 is fastened to one of the sliders 262 and protrudes outwardly from the slider 262 in the horizontal direction 12c. In the illustrated embodiment, a lower surface of the pressing tab 280 is flat and substantially parallel to the longitudinal and horizontal directions 12a, 12c.

The cart lock 198 may define a pivot 282 and a lever 284 that is rotatable about the pivot 282. The pivot 282 may be fixed relative to the housing 208, such as by fastening to the inner wall 192 of the dish station 172a-172d. The lever 284 protrudes on either side of the pivot 282 such that a first end of the pivot engages the pressing tab 280 when the lift arm 188 is lowered to the unlock position. A second end of the pivot is positioned having the pivot 282 positioned between the first end and the second end. The second end engages a lifting rod 286 such that when the first end is urged downwardly by the pressing tab 280, the second end lifts the lifting rod 286.

In the illustrated embodiment, the lifting rod 286 passes through a housing 288 having a return spring 290 positioned therein and encircling the lifting rod 286. A spring stop 292 secures to the lifting rod 286 within the housing 288 and is fixed relative to the rod 286 such that the spring 290 engages the spring stop 292 and urges the rod 286 downwardly toward a bottom wall 294 of the housing. The bottom wall 294 of the housing may limit movement of the spring stop 292 when the spring stop is pressed against the bottom wall 294 of the housing. The spring 290 likewise engages a top wall 296 of the housing, which may be removable to facilitate installation of the spring 290.

The lifting rod 286 extends outwardly form the top wall 296 and secures to an arm 300 protruding outwardly from the lifting rod 286, which includes protruding outwardly in a plane substantially parallel to the longitudinal and horizontal directions 12a, 12c. A locking post 302 secures to the arm 300 and protrudes downwardly therefrom offset from the lifting rod 286.

Figure 25:
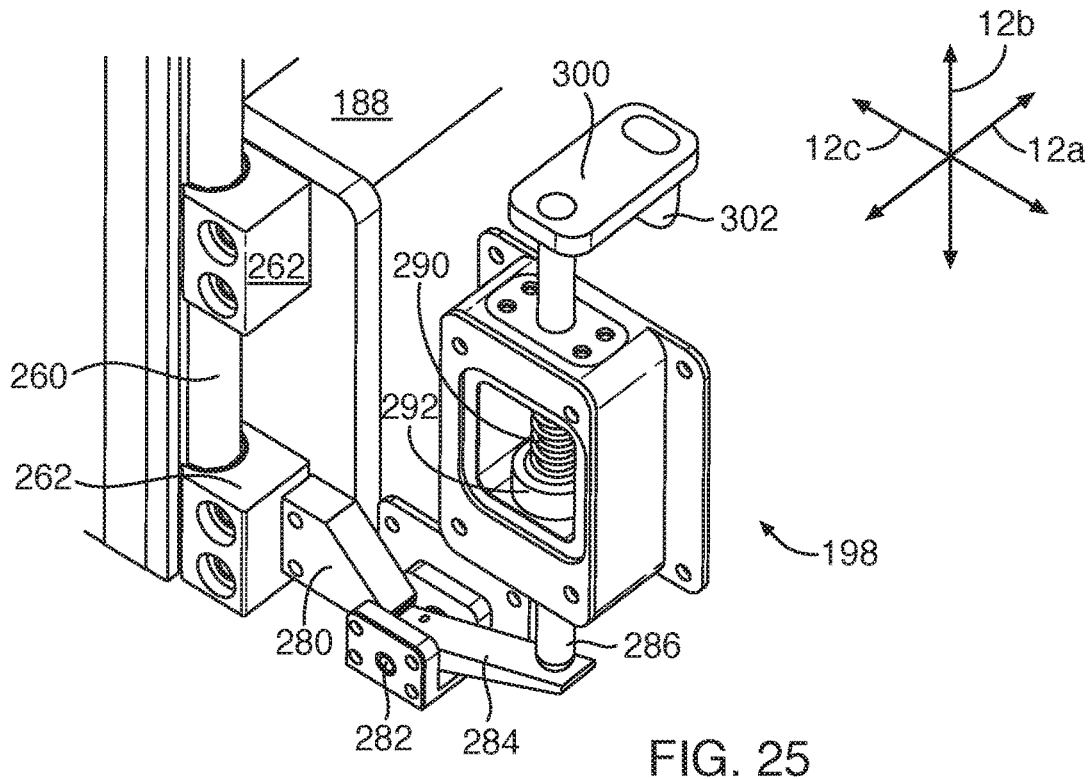
FIG. 25 is an isometric view of the cart lock mechanism of FIG. 24 showing the cart lock mechanism in an open state in accordance with an embodiment of the present invention.
Figure 26:
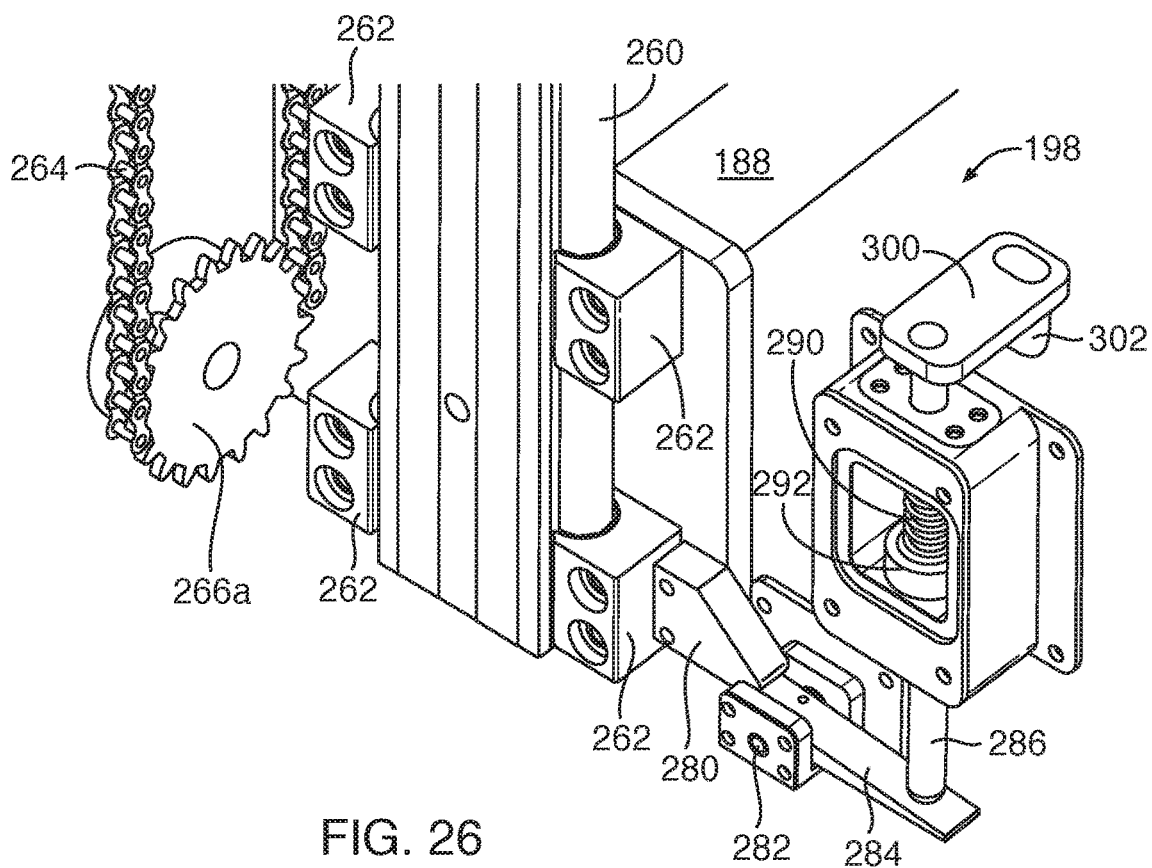
FIG. 26 is an isometric view of the cart lock mechanism of FIG. 24 showing the cart lock mechanism in a locked state in accordance with an embodiment of the present invention.

As shown in FIG. 25, when the lifting arm 188 and pressing tab 280 are lowered to the unlock position, the lever 284 presses upwardly on the lifting rod 286 and presses the spring stop 292 against the spring 290. This also raises the arm 300 and the locking post 302. As shown in FIG. 26, as the lifting arm 188 and pressing tab 280 are raised and pressure on the lever 284 is released, the spring 290 urges the spring stop 292 downwardly along with the lifting rod 286, thereby lowering the arm 300 and locking post 302.

FIGS. 27A to 27D illustrate interaction of the cart lock 198 with a cart 10, specifically the top plate 54 and aperture 100 of a cart 10. Note that some carts include two apertures 100 such that a dish drop station 172a-172d may include two cart locks 198 as described herein.

Figures 27A, 27B, 27C, 27D:
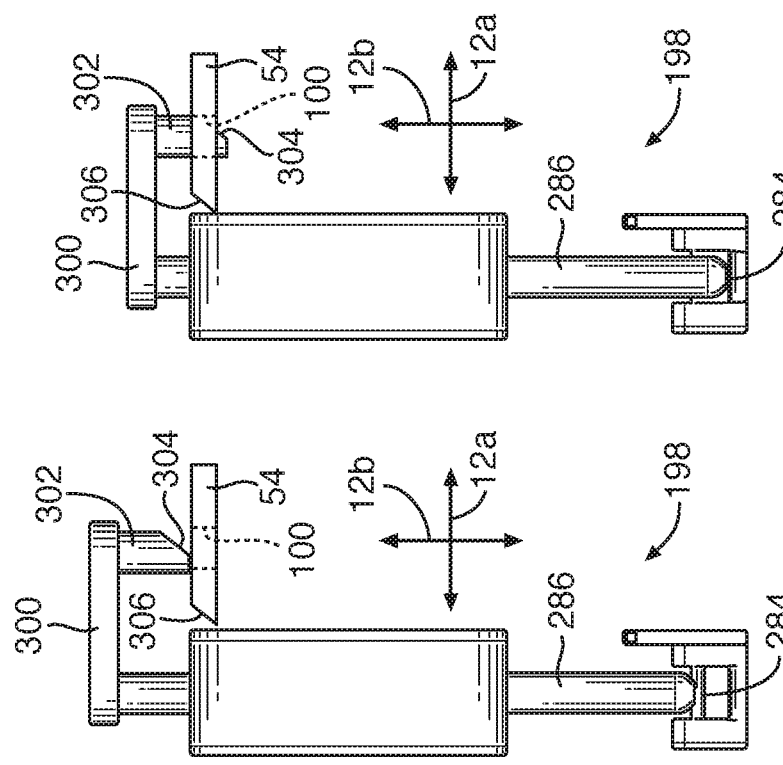
FIGS. 27A to 27D are side views showing a method of operation of the cart lock mechanism of FIG. 24 in accordance with an embodiment of the present invention.

Referring specifically to FIG. 27A, a user inserts a cart 10 into the dish drop station 172a-172d such that the top plate 54 engages the locking post 300. In the example of FIG. 27A, the arm 298 and 300 are lowered due to the lift arm 188 being above the unlock position, e.g., the home position. In the illustrated embodiment, the locking post 302 is provided with a beveled leading edge 304 that engages a beveled leading edge 306 of the plate 54 such that the locking post 302, arm 300, and lifting post 286 are urged upwardly against the restoring force of the spring 190, as shown in FIG. 27B. The cart 10 is pushed further inward such that the locking post 302 is urged to the location of the aperture 100 as shown in FIG. 27C. Upon reaching the opening 100, the locking post 100 is urged into the opening 100 due to the restoring force of the spring 190.

In another use case, the lift arm 188 is lowered to the unlock position thereby raising the arm 300 to the position shown in FIG. 27C. The cart 10 is then inserted such that the aperture 100 is positioned below the locking post 302. The arm 188 is then lifted from the unlock position, which permits the spring 190 to urge the locking post 302 into the opening 100. Removal is the opposite of insertion—the lift arm 188 is lowered to the unlock position, causing the arm 300 and locking post 302 to rise, thereby disengaging from the aperture 100 and permitting removal of the cart 10.

Figure 28B:
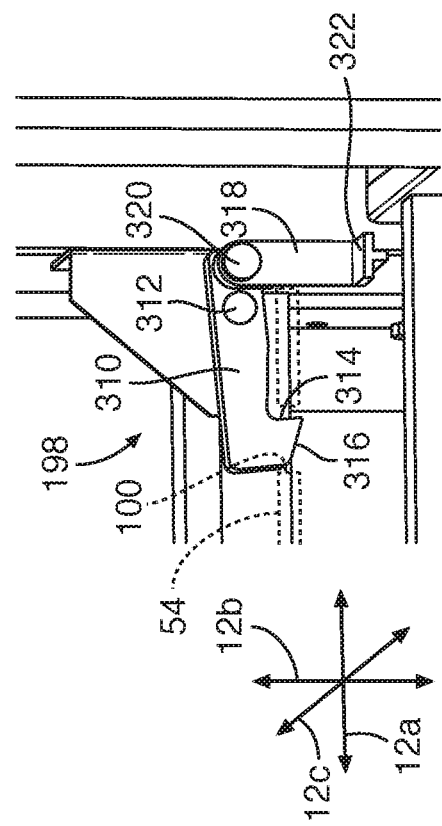
FIGS. 28A to 28C are isometric views illustrating operation of an alternative embodiment of a cart lock mechanism in accordance with an embodiment of the present invention.
Figure 28C:
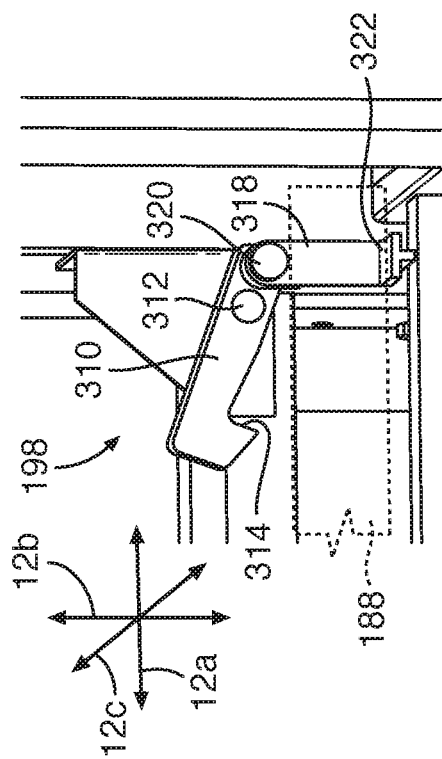
Figure 28A:
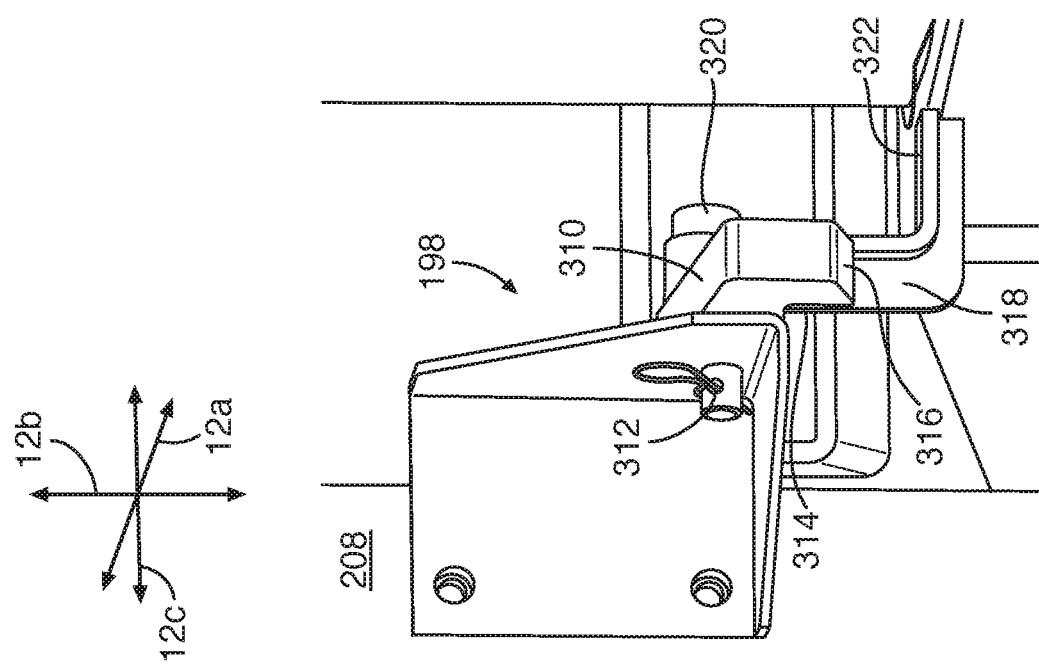

FIGS. 28A to 28C illustrate an alternative embodiment of a cart lock 198. In this embodiment, an arm 310 is pivotally mounted to the front housing 208, such as to a pivot 312, such that the arm 310 is rotatable about an axis substantially parallel to the horizontal direction 12*c*. The arm 310 defines a lock surface 314 that faces toward a front of the dish drop station 172*a*-172*d*, i.e. faces away from a dish cart 10 positioned in the dish drop station 172*a*-172*d*. Specifically, the lock surface 34 faces such that the lock surface may engage the opening 100 and resist removal of the dish cart 10.

The arm 310 may further define a sloped or beveled surface 316 that slopes downwardly with distance toward the front of the dish drop station 172*a*-172*d*. The sloped surface 316 may facilitate guiding the arm 310 over the front edge of the plate 54 when inserting a cart within the dish drop station 172*a*-172*d*.

A hanging arm 318 is suspended from the arm 310 from a pivot 320 about which the hanging arm 318 is rotatable. The pivot 320 defines an axis of rotation that is substantially parallel to the horizontal direction 12*c*. The pivot 312 is located on the arm 310 between the pivot 320 and the lock surface 314 such that a downward force on the hanging arm 318 results in rising of the lock surface 314. The hanging arm 318 defines a pressing surface 322 that protrudes outwardly from the arm 318. The pressing surface 322 may define a surface that for at least one position around the pivot 320 is substantially-parallel to the longitudinal and horizontal directions 12*a*, 12*c*.

In use, when the lift arm 188 is moved to the unlock position (see FIG. 28C), the lift arm 188 rests on the pressing surface 322, thereby urging the locking surface 314 upward and ready to receive a dish cart 10. When, the lift arm 188 is raised, the locking surface 314 pivots downward into the opening 100. This may be facilitated by gravity. In particular, the pivot 320 may be closer to pivot 312 such that the weight of the arm 310 on the opposite side of the pivot 312 is sufficient to overcome the weight of the hanging arm 318. In other embodiments, the arm 310 may be spring loaded such that it is urged into the position shown in FIG. 28B in the absence of force on the pressing surface 322.

Figure 29:
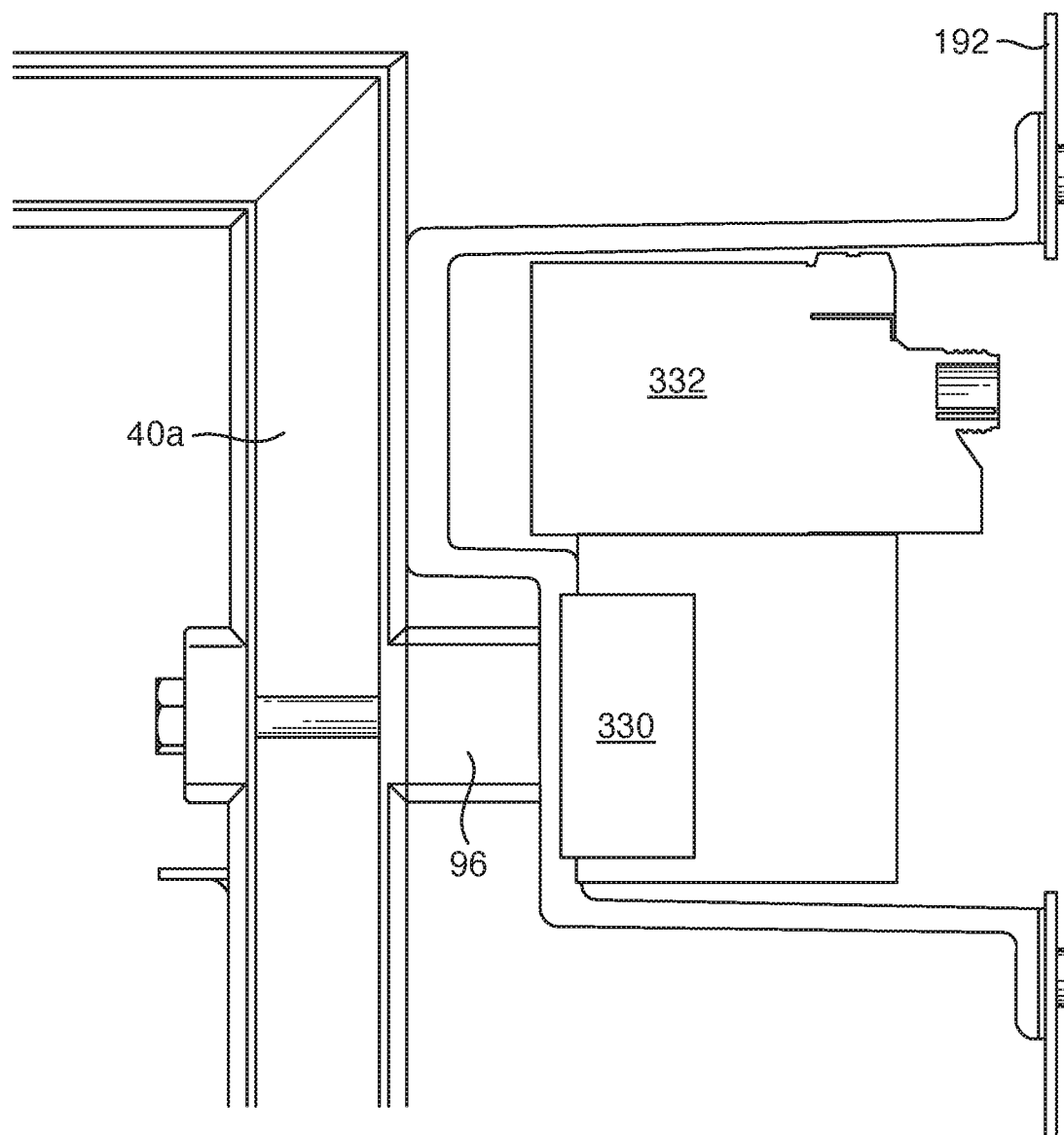
FIG. 29 is a side view illustrating an inductive sensor and magnetic detent in accordance with an embodiment of the present invention.

Referring to FIG. 29, in some embodiments, a dish drop station 172*a*-172*d* may include additional or alternative means for retaining a dish cart 10. For example, one or more ferromagnetic lugs 96 may secure to one or both front vertical posts 40*a*, 40*b* of a dish cart 10, such as according to the embodiment of FIG. 5. One or two magnetic detents 330 may mount to the inner wall 192 of the dish drop station 172*a*-172*d* and be positioned to engage the one or two lugs 96 when the cart is positioned in the dish drop station 172*a*-172*d*, i.e. exert a certain amount of pull on the lug 96, such as a force at least 3 to 20 Newtons when the cart 10 is pushed to its inwardmost position within the dish drop station 172*a*-172*d*.

In some embodiments, the controller of the dish drop station 172*a*-172*d* may be coupled to a cart present sensor 332 that detects whether a cart 10 is positioned within the dish drop station 172*a*-172*d*. For example, the cart present sensor 332 may be an inductive sensor that can detect the metal vertical posts 40*a* or 40*b* of a cart or other metal portion of the cart 10. In particular, the sensor 332 may be an inductive sensor positioned within a plastic housing (e.g., non-inductive, non-glass filled) yet able to sense metal positioned proximate the sensor 332 outside of the housing. Other types of sensors 332 may be used, such as a break beam sensor that is obstructed by the cart 10, a mechanical button or switch actuated when the cart 10 is inserted into the dish drop station 172*a*-172*d*, or some other type of sensor.

In some embodiments, if the controller receives an output from the sensor 332 that indicates that no cart 10 is present, the controller may be programmed to wait for a delay period followed by moving the lift arm 188 and paddle 190 to the home position if not already at the home position. In other embodiments, the controller prevents all movement of the lift arm 188 when no cart 10 is sensed as being present If the cart present sensor produces an output indicating a transition to a cart 10 being present, the controller may be programmed to raise the lift arm 188 from the home position until one of the following is true: (a) the lower stack height sensor 200*b* is obstructed while the stack height sensor 200*a* remains unobstructed (the cart 10 was loaded with dishes) or (b) the lift arm 188 reaches the full position (the cart 10 was empty and ready to be loaded).

Figure 30:
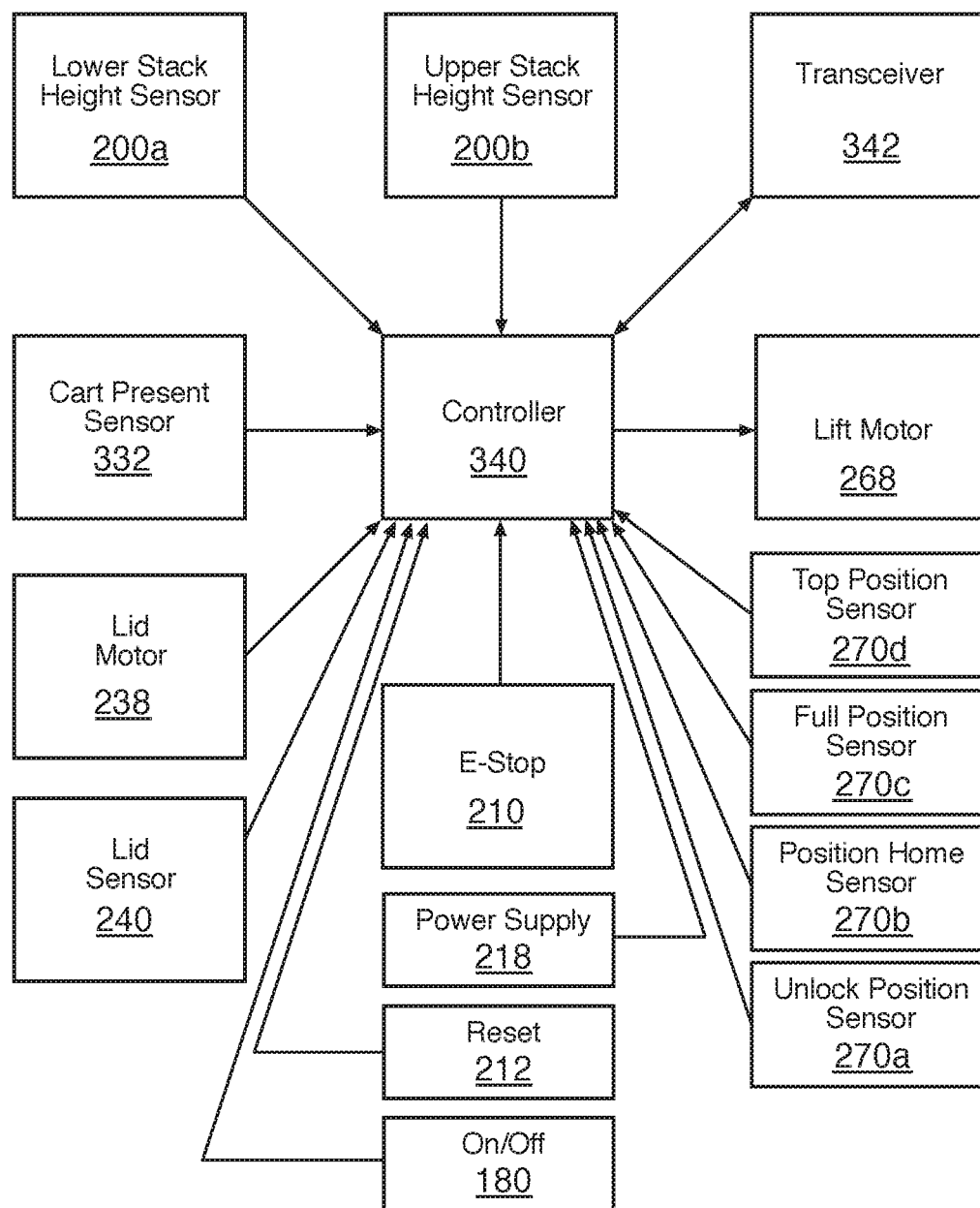
FIG. 30 is a schematic block diagram of a control system for a dish drop station in accordance with an embodiment of the present invention.

Referring to FIG. 30, references to a controller hereinabove may be performed by a controller 340 performed to perform those functions. The controller 340 may be embodied as a general purpose computer or a dedicated circuit programmed to perform the functions ascribed to the controller hereinabove. In particular, the controller 340 may control supply of power from the power supply 218 supplied to the lift motor 268 according to outputs received from some or all of the on/off switch 180, upper and lower stack height sensors 200*a*, 200*b*, the emergency stop button 210, reset button 212, the unlock position sensor 270*a*, the home position sensor 270*b*, the full position sensor 270*c*, the top position sensor 270*d*, and the cart present sensor 332.

In addition, the controller 340 may be coupled to a transceiver 342, such as a WI-FI transceiver, BLUETOOTH transceiver, or other type of wireless transceiver. As noted above, the antenna for the transceiver 342 may be mounted within the plastic collar 178. The controller 340 may be programmed to receive instructions through the transceiver 342 from a central controller or to transmits its state to a central controller. For example, the controller 340 may transmit a notification when the lift arm 188 reaching the full position, indicating that a cart 10 full of dirty dishes needs to be removed and replaced with an empty cart. The controller 340 may transmit a notification when the lift arm 188 reaches the top position, indicating that a cart 10 is empty of dishes and needs to be replaced with a cart 10 full of clean dishes. The controller 340 may transmit other information, such as a rate of rise or fall of the lift arm 188, which may be used to estimate when it will be empty or full, respectively, enabling preemptive preparation of a full or empty cart, respectively.

The controller 340 may transmit a notification in response to detection of a malfunction, such as sticking of the lift arm

188, which may be detected by the lift arm failing to move to a desired position (top, full, unlock) in response to the controller 340 instructing the motor 268 to move the lift arm 188 to the desired position.

The controller may transmit a notification upon detecting interaction with the button 180, e.g., a notification indicating that human attention at the dish cart station 172*a*-172*d* is required. For example, a user may push button 180 to indicate that a cart has been filled or empty and another empty or full cart, respectively, is needed.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed is:

1. A cart for transporting stacked dishes, the cart comprising:
    a base structure that defines a slot and a plurality of lobe openings, the slot and plurality of lobe openings configured to permit passage of a lift paddle of a dish drop station in which the lift paddle includes lobes at positions that correspond to positions of the lobe openings, and wherein the slot is configured to permit passage of a lift arm of the dish drop station past a first edge of the base structure;
    a plurality of wheels connected to the base structure; and
    a push handle connected to the base structure;
    a plurality of spacers connected to the base structure, each spacer extending inwardly such that inward facing surfaces of the plurality of spacers define an area sized to receive stacked dishes;
    wherein the slot and the plurality lobe openings define a contiguous opening in a horizontal support surface of the base structure;
    wherein the first edge of the base structure is a front edge of the base structure, wherein the push handle is connected at a back edge of the base structure, which is opposite the front edge of the base structure; and
    wherein the base structure includes an aperture configured to engage with a cart lock of the dish drop station.

2. The cart of claim 1, wherein the plurality of lobe openings extend out from the slot.

3. The cart of claim 1, wherein the plurality of spacers comprises a plurality of vertical spacers connected to the base structure perpendicular to the horizontal support surface of the base structure, each spacer extending inwardly to a center of the horizontal support surface such that inward facing surfaces of the plurality of spacers define an area sized to receive the stacked dishes.

4. The cart of claim 1, wherein the aperture is located closer to the front edge of the base structure than to any other edge of the base structure.

5. The cart of claim 4, wherein the front edge of the base structure is beveled to engage an element of the cart lock.

6. The cart of claim 4, wherein the aperture is in the horizontal support structure of the base structure.

7. The cart of claim 1, wherein the aperture is in the horizontal support structure of the base structure.

8. A cart for transporting stacked dishes, the cart comprising:
    a base structure that defines a slot and a plurality of lobe openings, the slot and plurality of lobe openings configured to permit passage of a lift paddle of a dish drop station in which the lift paddle includes lobes at positions that correspond to positions of the lobe openings, and wherein the slot is configured to permit passage of a lift arm of the dish drop station past a first edge of the base structure;
    a frame connected to the base structure;
    a plurality of wheels connected to the base structure; and
    a push handle connected to the base structure;
    a plurality of spacers connected to the frame, each spacer extending inwardly to a center of the frame such that inward facing surfaces of the plurality of spacers define an area within the frame that is sized to receive stacked dishes;
    wherein the plurality of lobe openings extend out from the slot and wherein the slot and the plurality lobe openings define a contiguous opening in a horizontal support surface of the base structure;
    wherein the first edge of the base structure is a front edge of the base structure, wherein the push handle is connected at a back edge of the base structure, which is opposite the front edge of the base structure; and
    wherein the base structure includes an aperture configured to engage with a cart lock of the dish drop station.

9. The cart of claim 8, wherein the plurality of spacers comprises a plurality of vertical spacers connected to the frame and perpendicular to the horizontal support surface of the base structure, each spacer extending inwardly to a center of the frame such that inward facing surfaces of the plurality of spacers define an area sized to receive the stacked dishes.

10. The cart of claim 8, wherein the aperture is located closer to the front edge of the base structure than to any other edge of the base structure.

11. The cart of claim 10, wherein the front edge of the base structure is beveled to engage an element of the cart lock.

12. The cart of claim 10, wherein the aperture is in the horizontal support structure of the base structure.

13. The cart of claim 8, wherein the aperture is in the horizontal support structure of the base structure.

* * * * *